US010514824B2

(12) United States Patent
Francisco et al.

(10) Patent No.: US 10,514,824 B2
(45) Date of Patent: Dec. 24, 2019

(54) PIVOT-BASED TILE GALLERY WITH ADAPTED TILE(S)

(71) Applicant: Microsoft Technology Licensing, LLC, Redmond, WA (US)

(72) Inventors: Jesse D. Francisco, Lake Stevens, WA (US); Leon E. Welicki, Issaquah, WA (US); Mo Wang, Seattle, WA (US); Joshua Prentice Keckley, Redmond, WA (US); Adam M. Abdelhamed, Duvall, WA (US); Brad M. Olenick, Kirkland, WA (US); Stephen Siciliano, Bellevue, WA (US); William J. Staples, Duvall, WA (US); Jonathan Harris, Sammamish, WA (US); Karandeep Singh Anand, Redmond, WA (US); Christopher Scrosati, Seattle, WA (US); Angela Moulden, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 779 days.

(21) Appl. No.: 14/957,479

(22) Filed: Dec. 2, 2015

(65) Prior Publication Data
US 2017/0010764 A1 Jan. 12, 2017

Related U.S. Application Data

(60) Provisional application No. 62/191,449, filed on Jul. 12, 2015.

(51) Int. Cl.
*G06F 3/0482* (2013.01)
*G06F 8/38* (2018.01)
*G06F 3/0484* (2013.01)

(52) U.S. Cl.
CPC ........ *G06F 3/0482* (2013.01); *G06F 3/04842* (2013.01); *G06F 8/38* (2013.01)

(58) Field of Classification Search
CPC .............................. G06F 3/04842; G06F 8/38
See application file for complete search history.

(56) References Cited

U.S. PATENT DOCUMENTS 7,765,490 B2 7/2010 Lai et al.
8,639,747 B2 1/2014 Seago et al.
(Continued)

OTHER PUBLICATIONS

Sharp, Remy, "Tiny two way data binding," retrieved on Jul. 18, 2019, from https://remysharp.com/2015/06/02/bind, published on Jun. 2, 2015. (Year: 2015).*

(Continued)

*Primary Examiner* — Eric J. Bycer
(74) *Attorney, Agent, or Firm* — Wade IP Law LLC

(57) ABSTRACT

Techniques are described herein that are capable of providing a pivot-based tile gallery with an adapted tile (e.g., in an application, such as a web application in a browser). A pivot is code that enables selection of a subset of tiles from multiple subsets of tiles. A pivot element is an interface element that represents a pivot. For instance, selection of the subset of tiles via the pivot may cause a user interface (UI) representation of the tile gallery to include UI representations of the tiles in the selected subset (e.g., and not UI representations of the tiles that are not included in the selected subset). An adapted tile is a tile that includes a wrapper and a second tile. The wrapper wraps the second tile. For instance, the wrapper may enable the adapted tile to use the second tile to implement functionality of an aspect of a resource.

20 Claims, 22 Drawing Sheets

(56) References Cited

U.S. PATENT DOCUMENTS

| | | | |
|---|---|---|---|
| 9,015,606 B2 | 4/2015 | Zaman et al. | |
| 2006/0005207 A1* | 1/2006 | Louch | G06F 8/38 719/328 |
| 2007/0027852 A1* | 2/2007 | Howard | G06F 3/0237 |
| 2007/0082707 A1* | 4/2007 | Flynt | G06F 3/0481 455/564 |
| 2007/0101291 A1* | 5/2007 | Forstall | G06F 3/0481 715/805 |
| 2008/0082627 A1* | 4/2008 | Allen | G06Q 10/10 709/217 |
| 2011/0214078 A1* | 9/2011 | Klask | G06F 8/38 715/763 |
| 2013/0057587 A1* | 3/2013 | Leonard | G06F 3/0488 345/660 |
| 2013/0145286 A1 | 6/2013 | Feng et al. | |
| 2013/0225151 A1 | 8/2013 | King et al. | |
| 2013/0227476 A1* | 8/2013 | Frey | G06F 3/0488 715/810 |
| 2013/0238383 A1 | 9/2013 | Licari et al. | |
| 2014/0075380 A1 | 3/2014 | Milirud et al. | |
| 2014/0129303 A1 | 5/2014 | Aiglstorfer | |
| 2014/0189592 A1* | 7/2014 | Benchenaa | G06F 3/04886 715/835 |
| 2014/0282261 A1 | 9/2014 | Ranz et al. | |
| 2015/0040104 A1 | 2/2015 | Mall et al. | |
| 2015/0106708 A1 | 4/2015 | Monte et al. | |

OTHER PUBLICATIONS

"The Tile Template Catalog (Windows Runtime Apps)", Published on: Jun. 25, 2014, 100 pages, Available at: https://msdn.microsoft.com/en-us/library/windows/apps/hh761491.aspx.

"SAP Cloud for Customer User Guide", Published on: May 2015, 358 pages, Available at: http://help.sap.com/saphelp_sapcloudforcustomer/en/PDF/EN-1.pdf.

"Creating Analytics and Reports", Retrieved on: Jun. 11, 2015, 11 pages, Available at: https://docs.oracle.com/cloud/latest/salescs_gs/FACER/F1514245AN 14917.htm#F1514245AN14917.

"Declarative > Imperative Reactive > Event Driven", Retrieved on: Jun. 11, 2015, 49, pages, Available at: http://viewmodel.meteor.com/.

"Amazon CloudWatch Product Details", Published on: Jul. 14, 2014, 6 pages, Available at: https://aws.amazon.com/cloudwatch/details/#custom-metrics-monitoring.

* cited by examiner

FIG. 17

PIVOT-BASED TILE GALLERY WITH ADAPTED TILE(S)

CROSS-REFERENCE TO RELATED APPLICATION(S)

This application claims the benefit of U.S. Provisional Application No. 62/191,449, filed Jul. 12, 2015 and entitled "Wrapping a Tile to Change User Interface Representation," the entirety of which is incorporated by reference herein.

BACKGROUND

A cloud management system can manage a variety of types of resources. Examples of a resource include but are not limited to a virtual machine (VM), a storage account, a website, a database, an application, and a portion of an application. Each resource may be associated with tile(s). A tile is information (e.g., code, metadata, etc.) that provides a user interface (UI) representation of an aspect of a resource that is accessible via an application. For instance, a tile may be offered to a user of the application via a user experience. Typically, each resource type that is associated with an application declares a corresponding set of tile(s). For example, some tiles may provide access to monitoring aspects (e.g., charts) of a resource, and other tiles may surface tools for the resource (e.g., connect to a remote access network protocol for a VM) or operational information (e.g., events for a VM).

The UI representations that are provided by the tiles may be presented in a gallery. For instance, the user of the application may review the UI representations in the gallery to determine aspects of the resources that are accessible via the application. A substantial number of tiles may be associated with the application. However, a number of UI representations that may be included in the gallery often is limited to a threshold number that is manageable by the user. Moreover, if the user elects a tile from the gallery for inclusion in a workspace, context associated with the tile or a portion thereof may be lost. For instance, an identifier that specifies a resource associated with the tile may be retained, but other properties of the tile may be lost.

SUMMARY

Various approaches are described herein for, among other things, providing a pivot-based tile gallery with an adapted tile (e.g., in an application, such as a web application in a browser). A tile gallery is information (e.g., code, metadata, etc.) that includes multiple tiles. A pivot-based tile gallery is a tile gallery that includes at least one pivot. A pivot is code that enables selection of a subset of tiles from multiple subsets of tiles. A pivot element is an interface element that represents a pivot. For instance, selection of the subset of tiles via the pivot may cause a user interface (UI) representation of the tile gallery to include UI representations of the tiles in the selected subset (e.g., and not UI representations of the tiles that are not included in the selected subset). An adapted tile is a tile that includes a wrapper and a second tile. The wrapper wraps the second tile. For instance, the wrapper may enable the adapted tile to use the second tile to implement functionality of an aspect of a resource. An aspect of a resource has functionality to provide a UI representation that includes information that pertains to the resource. An example of an aspect is code configured to provide a chart, a notification, or other information pertaining to the resource.

In an example approach, a designated tile is wrapped in a wrapper to provide an adapted tile. The designated tile is configured to implement functionality of a designated aspect of a designated resource that is accessible via an application based on first input(s). The wrapper is configured to utilize the designated tile to implement the functionality of the designated aspect of the designated resource based on second input(s). A tile gallery is generated that includes tiles that are configured to provide user interface (UI) representations of aspects of resources that are accessible via the application. A first pivot element is displayed that enables selection of a subset from subsets of the tiles. First UI representations of the aspects that are provided by the tiles in a selected subset, which is selected via the first pivot element, are displayed. The first UI representations include a designated UI representation that corresponds to the adapted tile and that is selectable to cause the functionality of the designated aspect to be implemented.

In another approach, a tile gallery is generated that includes tiles that are configured to provide UI representations of aspects of resources that are accessible via an application. A first pivot element is displayed that enables selection of a subset from subsets of the tiles. First UI representations of the aspects that are provided by the tiles in a selected subset, which is selected via the first pivot element, are displayed. The first UI representations are selectable to cause functionality of the aspects that are associated with the respective tiles to be implemented. The selected subset includes a designated tile and an adapted tile. The adapted tile includes the designated tile and a wrapper that wraps the designated tile.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIGS. 5-18 are example screenshots of an application in accordance with embodiments.

Figure 1:
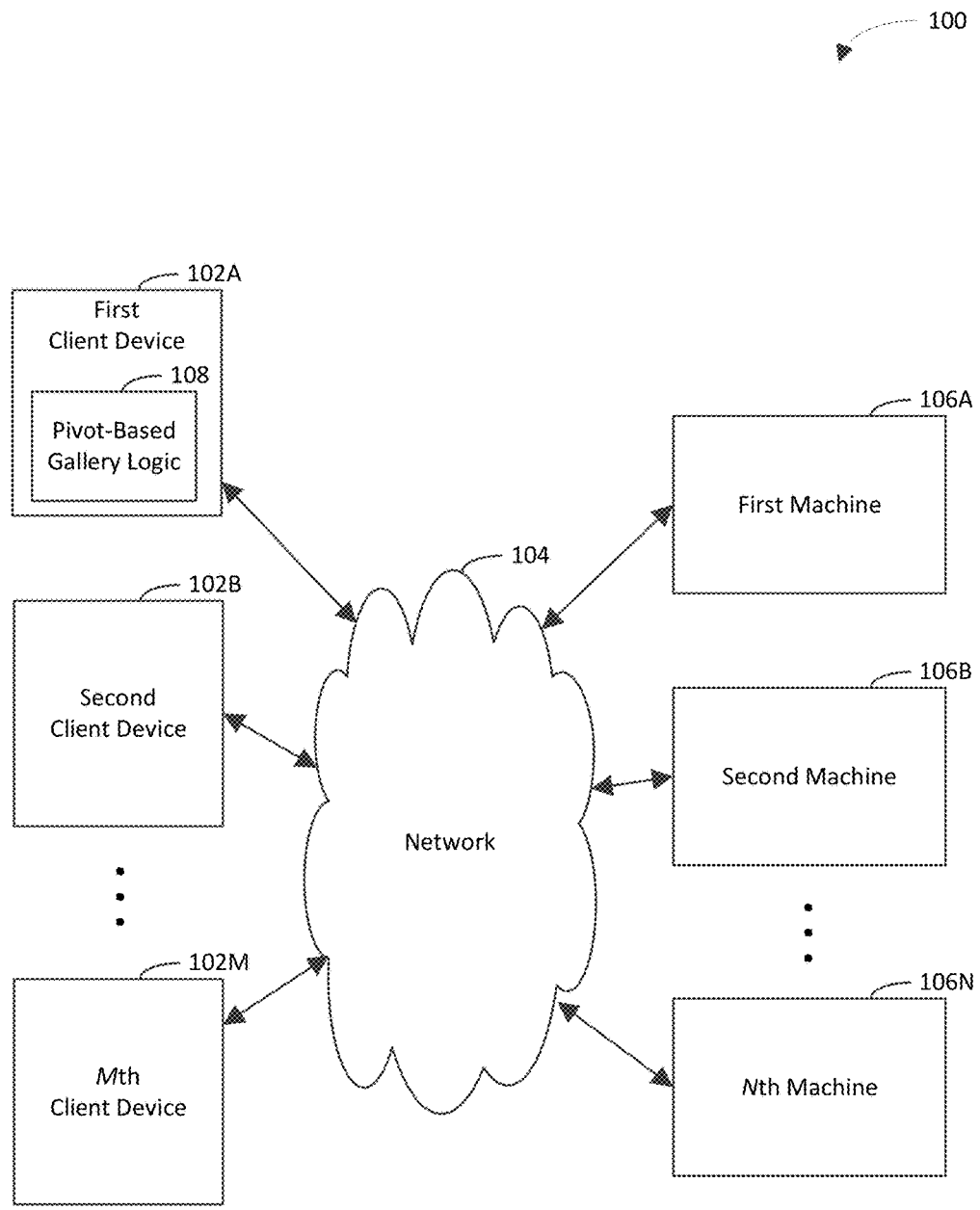
FIG. 1 is a block diagram of an example tile adapter system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of providing a pivot-based tile gallery with an adapted tile (e.g., in an application, such as a web application in a browser). A tile gallery is information (e.g., code, metadata, etc.) that includes multiple tiles. A pivot-based tile gallery is a tile gallery that includes at least one pivot. A pivot is code that enables selection of a subset of tiles from multiple subsets of tiles. A pivot element is an interface element that represents a pivot. For instance, selection of the subset of tiles via the pivot may cause a user interface (UI) representation of the tile gallery to include UI representations of the tiles in the selected subset (e.g., and not UI representations of the tiles that are not included in the selected subset). An adapted tile is a tile that includes a wrapper and a second tile. The wrapper wraps the second tile. For instance, the wrapper may enable the adapted tile to use the second tile to implement functionality of an aspect of a resource. An aspect of a resource has functionality to provide a UI representation that includes information that pertains to the resource. An example of an aspect is code configured to provide a chart, a notification, or other information pertaining to the resource.

In one example, a designated tile is wrapped in a wrapper to provide an adapted tile. The designated tile is configured to implement functionality of a designated aspect of a designated resource that is accessible via an application based on first input(s). The wrapper is configured to utilize the designated tile to implement the functionality of the designated aspect of the designated resource based on second input(s). A tile gallery is generated that includes tiles that are configured to provide user interface (UI) representations of aspects of resources that are accessible via the application. A first pivot element is displayed that enables selection of a subset from subsets of the tiles. First UI representations of the aspects that are provided by the tiles in a selected subset, which is selected via the first pivot element, are displayed. The first UI representations include a designated UI representation that corresponds to the adapted tile and that is selectable to cause the functionality of the designated aspect to be implemented.

In another example, a tile gallery is generated that includes tiles that are configured to provide UI representations of aspects of resources that are accessible via an application. A first pivot element is displayed that enables selection of a subset from subsets of the tiles. First UI representations of the aspects that are provided by the tiles in a selected subset, which is selected via the first pivot element, are displayed. The first UI representations are selectable to cause functionality of the aspects that are associated with the respective tiles to be implemented. The selected subset includes a designated tile and an adapted tile. The adapted tile includes the designated tile and a wrapper that wraps the designated tile.

Example techniques described herein have a variety of benefits as compared to conventional techniques for providing a tile gallery. For instance, the example techniques may increase efficiency of a computing device with respect to creating tiles for inclusion in a tile gallery and/or locating desired tiles in the tile gallery. The example techniques may reduce an amount of time and/or resources (e.g., processor cycles, memory) that are consumed by a computing device to create the tiles and/or to locate the desired tiles in the tile gallery. The example techniques may increase user interaction performance (e.g., quality of user experience) associated with creating and/or locating tiles. For example, the user may use pivot(s) to reduce the number of UI representations of tiles presented to the user in a UI representation of the tile gallery. In accordance with this example, using a pivot may cause the UI representation of the tile gallery to include UI representations of only those tiles having an attribute that matches a criterion associated with the pivot.

Multiple configurations of a designated tile may be created by wrapping the designated tile in wrapper(s). Each configuration of the designated tile may be configured to implement the same functionality of the same aspect of the same resource in a different manner. Each configuration may be configured to provide different information regarding the same resource. For instance, each resulting tile may be configured to generate a chart that includes information that differs from the information in the other charts. Accordingly, the example techniques may enable a computing device to reuse an aspect of a resource (e.g., by providing multiple UI representations of the aspect in the UI representation of the tile gallery).

FIG. 1 is a block diagram of an example tile adapter system 100 in accordance with an embodiment. Generally speaking, tile adapter system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information.

In accordance with example embodiments described herein, tile adapter system 100 provides a pivot-based tile gallery with an adapted tile (e.g., in an application, such as a web application in a browser). Detail regarding techniques for providing a pivot-based tile gallery with an adapted tile is provided in the following discussion.

As shown in FIG. 1, tile adapter system 100 includes a plurality of client devices 102A-102M, a network 104, and a plurality of machines 106A-106N. Communication among client devices 102A-102M and machines 106A-106N is carried out over network 104 using well-known network communication protocols. Network 104 may be a wide-area network (e.g., the Internet), a local area network (LAN), another type of network, or a combination thereof.

Client devices 102A-102M are processing systems that are capable of communicating with machines 106A-106N. An example of a processing system is a system that includes at least one processor that is capable of manipulating data in accordance with a set of instructions. For instance, a processing system may be a computer, a personal digital assistant, etc. Client devices 102A-102M are configured to provide requests to machines 106A-106N for requesting information stored on (or otherwise accessible via) machines 106A-106N. For instance, a user may initiate a request for executing a computer program (e.g., an application) using a client (e.g., a Web browser, Web crawler, or other type of client) deployed on a client device 102 that is owned by or otherwise accessible to the user. In accordance with some example embodiments, client devices 102A-102M are capable of accessing domains (e.g., Web sites) hosted by machines 106A-106N, so that client devices 102A-102M may access information that is available via the domains. Such domain may include Web pages, which may be provided as hypertext markup language (HTML) documents and objects (e.g., files) that are linked therein, for example.

Client devices 102A-102M may include any client-enabled system or device, including but not limited to a desktop computer, a laptop computer, a tablet computer, a personal digital assistant, a cellular telephone, a wearable device, or the like. It will be recognized that any one or more client devices 102A-102M may communicate with any one or more machines 106A-106N.

First client device 102A is shown to include pivot-based gallery logic 108 for illustrative purposes. Pivot-based gallery logic 108 is configured to provide a pivot-based tile gallery with an adapted tile (e.g., in an application, such as a web application in a browser). For example, pivot-based gallery logic 108 may wrap a designated tile in a wrapper to provide an adapted tile. Pivot-based gallery logic 108 may configure the designated tile to implement functionality of a designated aspect of a designated resource that is accessible via an application based on first input(s). The wrapper is configured to utilize the designated tile to implement the functionality of the designated aspect of the designated resource based on second input(s). Pivot-based gallery logic 108 may generate a tile gallery that includes tiles that are configured to provide user interface (UI) representations of aspects of resources that are accessible via the application. Pivot-based gallery logic 108 may display a first pivot element that enables selection of a subset from subsets of the tiles. Pivot-based gallery logic 108 may display first UI representations of the aspects that are provided by the tiles in a selected subset, which is selected via the first pivot element. The first UI representations include a designated UI representation that corresponds to the adapted tile and that is selectable to cause the functionality of the designated aspect to be implemented.

In another example, pivot-based gallery logic 108 may generate a tile gallery that includes tiles that are configured to provide UI representations of aspects of resources that are accessible via an application. Pivot-based gallery logic 108 may display a first pivot element that enables selection of a subset from subsets of the tiles. Pivot-based gallery logic 108 may display first UI representations of the aspects that are provided by the tiles in a selected subset, which is selected via the first pivot element. The first UI representations are selectable to cause functionality of the aspects that are associated with the respective tiles to be implemented. The selected subset includes a designated tile and an adapted tile. The adapted tile includes the designated tile and a wrapper that wraps the designated tile.

Pivot-based gallery logic 108 or a portion thereof may be included in (e.g., incorporated into) a browser (e.g., a web browser), though the scope of the example embodiments is not limited in this respect.

Example techniques for providing a pivot-based tile gallery with an adapted tile are discussed in greater detail below with reference to FIGS. 2-21.

Machines 106A-106N are processing systems that are capable of communicating with client devices 102A-102M. Machines 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, machines 106A-106N are configured to host respective Web sites, so that the Web sites are accessible to users of tile adapter system 100.

Pivot-based gallery logic 108 is shown to be incorporated in device 102A for illustrative purposes and is not intended to be limiting. It will be recognized that at least a portion (e.g., all) of pivot-based gallery logic 108 may be external to first client device 102A. For example, at least a portion of pivot-based gallery logic 108 may be incorporated in any one or more of the machines 106A-106N. In accordance with this example, client-side aspects of pivot-based gallery logic 108 may be incorporated in client device 102A, and server-side aspects of pivot-based gallery logic 108 may be incorporated in one or more of the machines 106A-106N. Pivot-based gallery logic 108 may be incorporated in a tooling application, though the scope of the example embodiments is not limited in this respect. A tooling application is an application that is capable of being used to perform diagnostic operations (e.g., identifying source of problem, debugging, profiling, controlling, etc.) with respect to resource(s). Examples of a resource include but are not limited to an application, a portion of an application, a database, a virtual machine, and a website. Examples of a tooling application include but are not limited to a web development program (e.g., Windows Azure Platform®, Amazon Web Services®, Google App Engine®, VMWare®, Force.com®, etc.) and an integrated development environment (e.g., Microsoft Visual Studio®, JDeveloper®, NetBeans®, Eclipse Platform™, etc.).

Pivot-based gallery logic 108 may be implemented in various ways to provide a pivot-based tile gallery with an adapted tile, including being implemented in hardware, software, firmware, or any combination thereof. For example, pivot-based gallery logic 108 may be implemented as computer program code configured to be executed in one or more processors. In another example, pivot-based gallery logic 108 may be implemented as hardware logic/electrical circuitry. For instance, pivot-based gallery logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

It will be recognized that any one or more of client devices 102A-102M and/or any one or more of machines 106A-106N may be implemented as a virtual machine, though the scope of the example embodiments is not limited in this respect.

Figure 2:
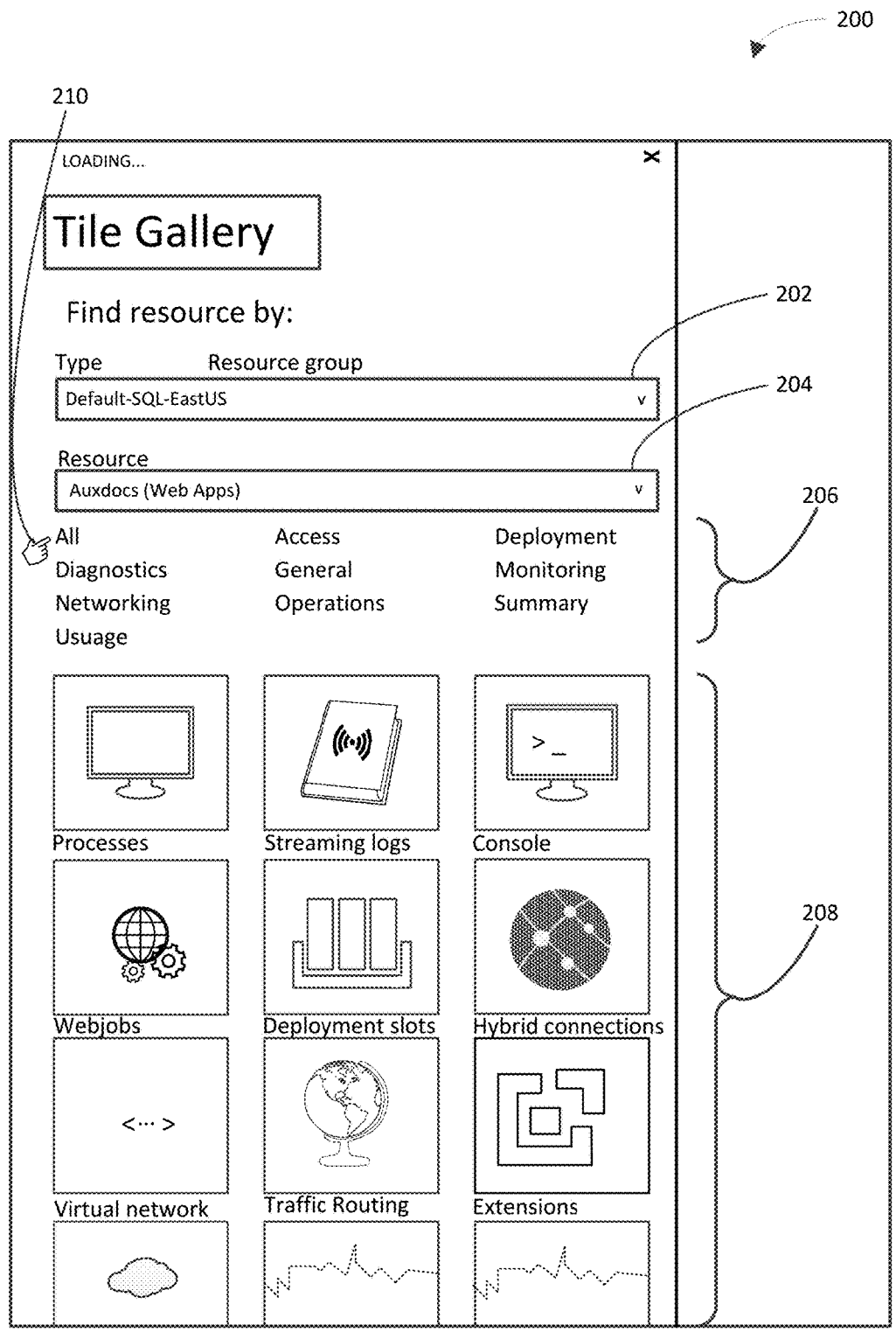
FIG. 2 depicts an example representation of a pivot-based tile gallery in accordance with an embodiment.

FIG. 2 depicts an example representation of a pivot-based tile gallery 200 in accordance with an embodiment. Pivot-based tile gallery 200 includes a first pivot 202, a second pivot 204, and a third pivot 206. First pivot 202 is configured to enable selection of a resource group from multiple resource groups for illustrative purposes. Each resource group includes a respective subset of a corpus of resources. Accordingly, first pivot 202 may enable UI representations of tiles for all the resources in the selected resource group to be displayed. The resources may be grouped based on resource type, location, application, and/or other criteria. For example, resources of a first type may be included in a first resource group; resources of a second type may be included in a second resource group, and so on. In another example, resources available from (e.g., stored at) a first location may be included in a first resource group; resources available from a second location may be included in a second resource group, and so on. In yet another example, resources associated with a first application may be included in a first resource group; resources associated with a second application may be included in a second resource group, and so on. Including resources in a resource group provides a way of managing the resources together (e.g., collectively). First pivot 202 shows that a resource group named "Default-SQL-EastUS" is selected for illustrative purposes.

Selection of the "Default-SQL-EastUS" resource group via first pivot 202 may cause a UI representation of the tile gallery 200 to include UI representations of tiles that correspond to the "Default-SQL-EastUS" resource group (and to not include UI representations of tiles that do not correspond to the "Default-SQL-EastUS" resource group). For instance, selection of first pivot 202 may cause the UI representations of the tiles that do not correspond to the "Default-SQL-EastUS" resource group to be removed from the UI representation of pivot-based tile gallery 200.

Second pivot 204 is configured to enable selection of a resource from the resources in the selected resource group (i.e., "Default-SQL-EastUS" in this example) for illustrative purposes. Each resource is associated with a respective subset of a corpus of tiles. Accordingly, second pivot 204 may enable UI representations of tiles that are associated with the selected resource to be displayed. Second pivot 204 shows that a resource named "Auxdocs (Web Apps)" is selected for illustrative purposes.

Selection of the "Auxdocs (Web Apps)" resource via second pivot 204 may cause the UI representation of the tile gallery 200 to include UI representations of tiles that are associated with the "Auxdocs (Web Apps)" resource (and to not include UI representations of tiles that are not associated with the "Auxdocs (Web Apps)" resource). For instance, selection of second pivot 204 may cause the UI representations of the tiles that are not associated with the "Auxdocs (Web Apps)" resource to be removed from the UI representation of pivot-based tile gallery 200.

Third pivot 206 is configured to enable selection of one of multiple categories. Each category corresponds to a respective subset of the tiles that are associated with the selected resource. In the embodiment of FIG. 2, the categories are named "All," "Access," "Deployment," "Diagnostics," "General," "Monitoring," "Networking," "Operations," "Summary," and "Usage." A cursor 210 is placed proximate the category named "All" to indicate that the "All" category is selected. Accordingly, UI representations 208 of all the respective aspects of the "Auxdoc (Web Apps)" resource that are provided by the respective tiles in the "All" category are listed beneath the category filter 206. The aspects of the "Auxdoc (Web Apps)" resource are shown in FIG. 2 to include "Processes," "Streaming logs," "Console," "WebJobs," "Deployment slots," "Hybrid connections," "Virtual network," "Traffic Routing," "Extensions," etc. Each of the UI representations 208 includes a respective icon and respective text, which indicate (e.g., describe) the respective aspect of the "Auxdoc (Web Apps)" resource.

Once a UI representation that is provided by an individual tile to be used is located, the UI representation can be dragged and dropped to its intended location (e.g., in a workspace on a display of the user's computing device). Any two or more of the tiles can include different code artifacts or multiple configurations of the same artifact.

In an example embodiment, an author of an experience (a.k.a. an extension) that runs in a portal declares all the tiles that are to be exposed in pivot-based tile gallery 200. The tiles are described in a "Catalog" of tiles, which is a combination of metadata and code artifacts. The metadata includes information that is sufficient to drive UI (e.g., images, names, descriptions, etc.) for the tiles in pivot-based tile gallery 200. The code is used to implement functionality associated with the tiles when the tiles are selected in pivot-based tile gallery 200. In a Model-View-ViewModel approach, the code may be a ViewModel.

Figure 3:
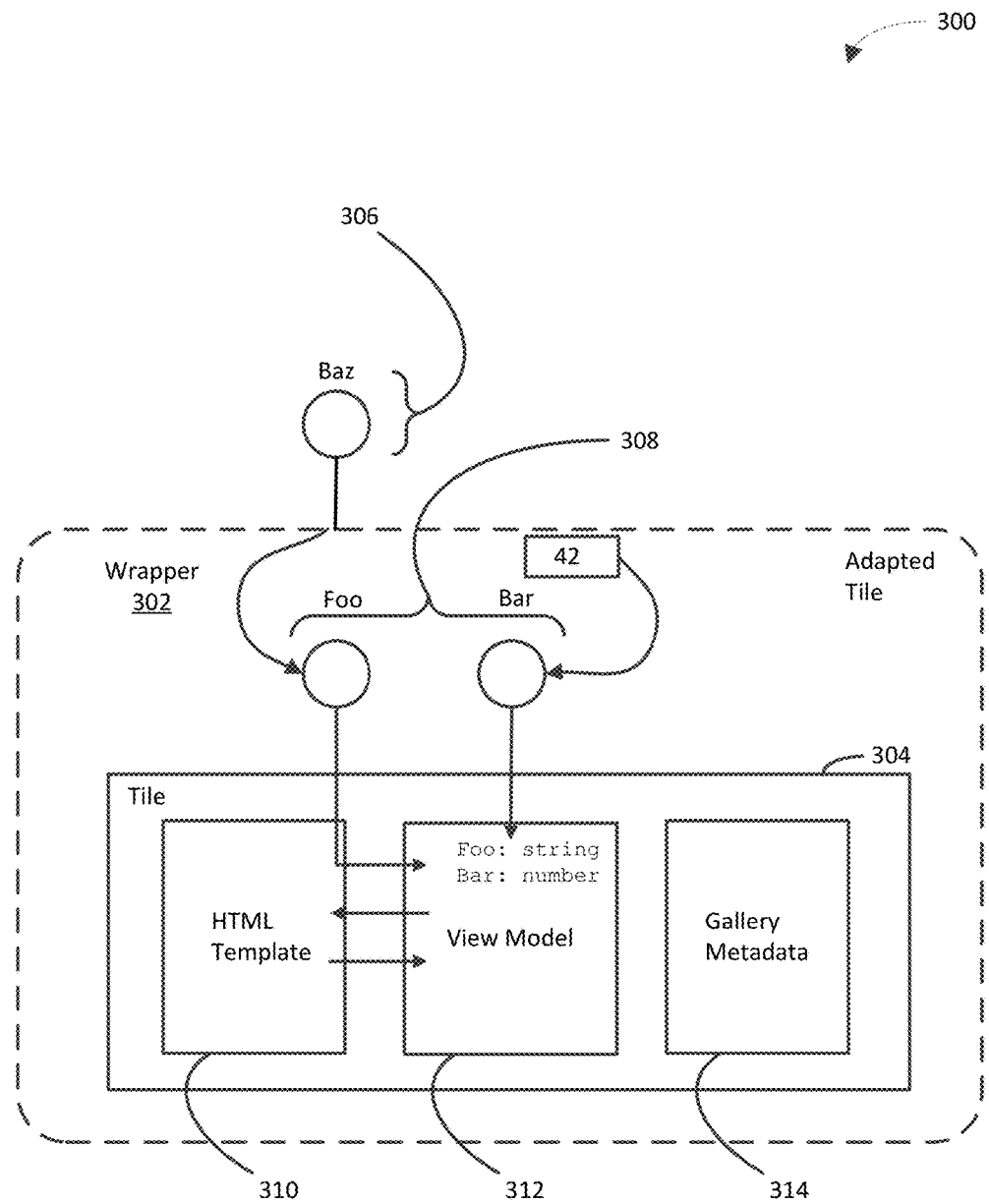
FIG. 3 is a block diagram of an example adapted tile in accordance with an embodiment.

FIG. 3 is a block diagram of an example adapted tile 300 in accordance with an embodiment. As shown in FIG. 3, adapted tile 300 includes a wrapper 302, a tile 304, and a public interface 306. Tile 304 includes a public interface 308, an HTML template 310, a ViewModel 312, and gallery metadata 314. In the tile 304, the public interface 308 exposes properties Foo and Bar for illustrative purposes. Foo and Bar are declared as a string and a number, respectively, for illustrative purposes and are not intended to be limiting.

The ViewModel 312 binds to the properties Foo and Bar. The ViewModel 312 includes code that is configured to implement functionality associated with the aspect of the resource with which tile 304 is associated. The HTML template 310 consumes and/or updates the properties Foo and Bar. The gallery metadata 314 drives the tile gallery UI.

The wrapper 302 wraps the tile 304. For example, the wrapper 302 may be a data structure that is configured to include the tile 304. In accordance with this example, the wrapper 302 may be configured to map inputs (e.g., properties) of the tile 304 to inputs of the adapted tile 300. The wrapper 302 is shown to expose a single property, Baz, for illustrative purposes. The property Baz is exposed by the public interface 306. Baz is bound to Foo. Note that Baz alternatively could have been referred to as "Foo". However, in the embodiment of FIG. 3, Baz has been given a name that is different from "Foo" to match a hypothetical expected interface. The property Bar, which is exposed by the public interface 308, is bound to a constant (42) for illustrative purposes.

Below are example code snippets for creating a UI representation of the adapted tile 300 in a tile gallery (e.g., the gallery 200).

First, the wrapper 302 (a.k.a. adapter part or adapter) is declared in PDL:

```
<!--
The wrapper takes a set of inputs and internally produces a different
set of inputs that are required by a designated tile.
This example SnowmobileResourceMapPart accepts a resource id as input
and in turn produces the asset id, asset owner and assetType of the
ResourceMapPart of HubsExtension.
-->
<AdapterPart Name="SnowmobileResourceMapPart"
        AdapterViewModel="{ViewModel
Name=SnowmobileResourceMapPartAdapterViewModel,
Module=./Snowmobile/ViewModels/
SnowmobileResourceMapPartAdapterViewModel}"
        InitialSize="HeroWide"
        AssetType="Snowmobile"
        AssetIdProperty="id">
    <AdapterPart.InputDefinitions>
      <InputDefinition Name="id"
            Type="MsPortalFx.ViewModels.ResourceId" />
    </AdapterPart.InputDefinitions>
    <PartReference Name="ResourceMapPartForSnowmobile"
          PartType="ResourceMapPart"
          Extension="HubsExtension">
      <PartReference.PropertyBindings>
        <!-- Binds the asset id from the adapter -->
        <Binding Property="assetId"
            Source="{Adapter assetId}" />
        <!-- Binds the constant value of asset owner -->
        <Binding Property="assetOwner"
            Source="{Constant SamplesExtension}" />
        <!-- Binds the constant value of the asset type -->
        <Binding Property="assetType"
            Source="{Constant Snowmobile}" />
      </PartReference.PropertyBindings>
    </PartReference>
    <PartGalleryInfo Title="{Resource snowmobileResourceMapPart,
Module=ClientResources}"
            Description="{Resource snowmobileGalleryPartDescription,
Module=ClientResources}"
            Category="{Resource partGalleryCategorySample,
Module=ClientResources}"
Thumbnail="MsPortalFx.Base.Images.PartGallery.ResourceMap( )"
            ThumbnailStretch="Fill" />
</AdapterPart>
Second, the adapter view model 312 is created:
  export class SnowmobileResourceMapPartAdapterViewModel {
  /**
   * The asset id that the resource map part of HubsExtension requires as
input.
   */
    public assetId = ko.observable<any>( );
    private _mappingViewModel:
MappingViewModel.SnowmobileResourceMappingViewModel;
    constructor(container: MsPortalFx.ViewModels.ContainerContract,
initialValue: any, dataContext: ResourceTypesArea.DataContext) {
      this._mappingViewModel = new
MappingViewModel.SnowmobileResourceMappingViewModel(container,
initialValue, dataContext);
    }
  /**
   * Invoked when the inputs change.
   *
   * @param inputs Collection of inputs passed from the shell.
   * @returns A promise that that needs to be resolved when data
loading is complete.
   */
    public onInputsSet(inputs: any): MsPortalFx.Base.Promise {
      this.assetId(this._mappingViewModel.maps(inputs.id));
      return null;
    }
  }
```

Figure 4:
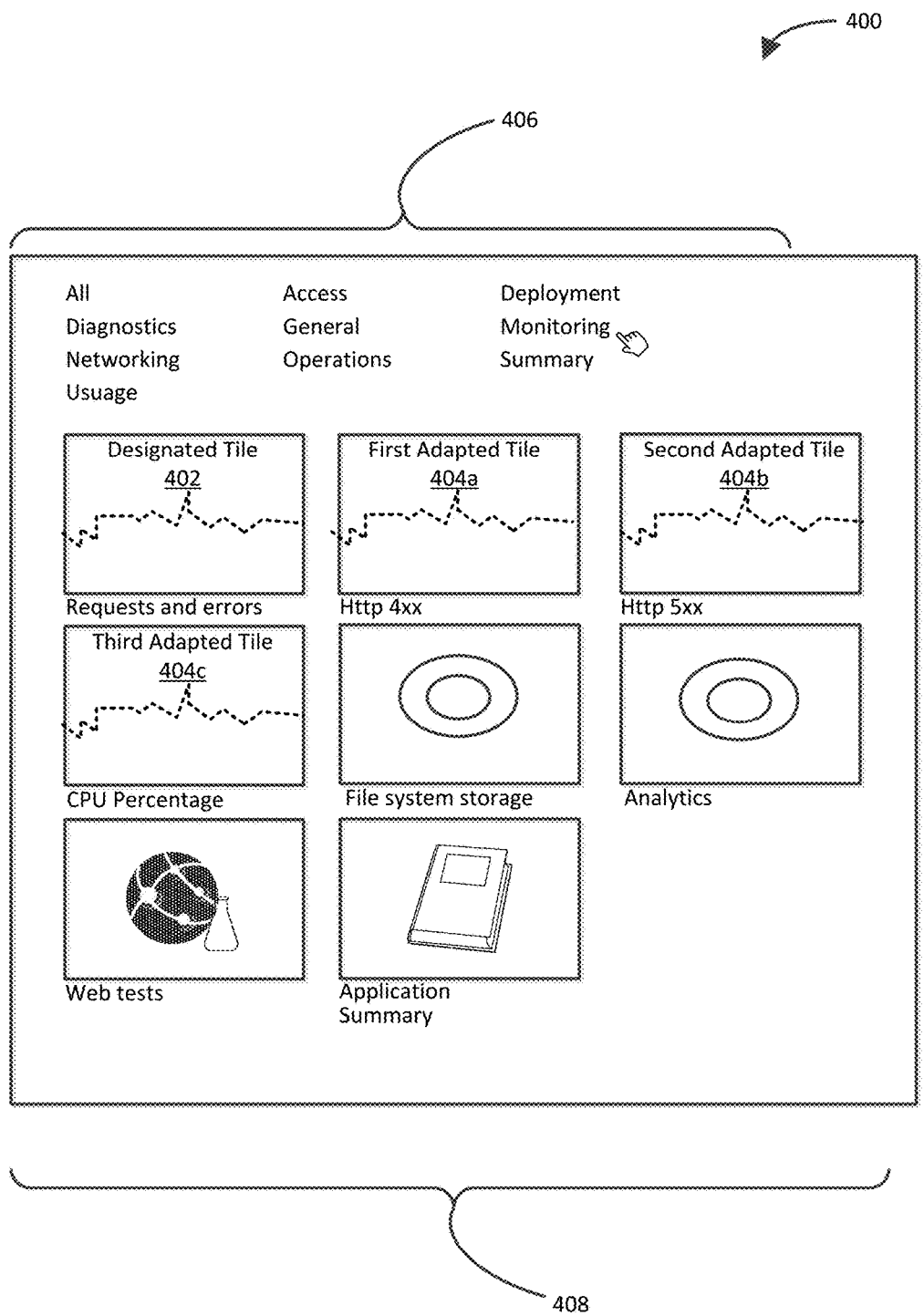
FIG. 4 depicts an example representation of a tile gallery that includes UI representations of wrapped tiles in accordance with an embodiment.

FIG. 4 depicts an example representation of a tile gallery 400 that includes UI representations of wrapped tiles in accordance with an embodiment. Tile gallery 400 includes a pivot 406 and UI representations 408 of respective tiles. Pivot 406 is shown to specify the same categories that are specified in third pivot 206 shown in FIG. 2 for illustrative purposes. The "Monitoring" category is shown to be selected in FIG. 4 for illustrative purposes. Accordingly, the UI representations 408 of tiles that are included in the "Monitoring" category are listed under pivot 406.

The UI representations 408 include a UI representation of a designated tile 402; a UI representation of a first adapted tile 404*a*, a UI representation of a second adapted tile 404*b*, and a UI representation of a third adapted tile 404*c*. The first, second, and third adapted tiles 404*a*-404*c* are wrapped versions of the designated tile 402. For instance, the first adapted tile 404*a* includes the designated tile 402 and a first wrapper, which wraps the designated tile 402 in in the first adapted tile 404*a*. The second adapted tile 404*b* includes the designated tile 402 and a second wrapper, which wraps the designated tile 402 in the second adapted tile 404*b*. The third adapted tile 404*c* includes the designated tile 402 and a third wrapper, which wraps the designated tile 402 in the third adapted tile 404*c*. Accordingly, tiles 402, 404*a*, 404*b*, and 404*c* may be said to be respective configurations of the same tile, namely the designated tile 402. The remaining tiles are single instances exposed in the tile gallery 400. In an example, tiles 402, 404*a*, 404*b*, and 404*c* may correspond to the same underlying chart that gets information from the same backend. In accordance with this example, tiles 402, 404*a*, 404*b*, and 404*c* may be configured to provide different metrics using the same underlying chart. Each of the adapted tiles 404*a*-404*c* may be custom-created by a user or preconfigured.

As illustrated in FIG. 4, the example techniques may be capable of enabling a user to provide the same UI element with different configurations. From an end user perspective, it may appear that multiple tiles are provided. For instance, the adapted tiles 404*a*-404*c* may appear to be distinct (e.g., independent) tiles. From an implementation perspective, a single tile having multiple configurations may be provided. For instance, the adapted tiles 404*a*-404*c* may be different configurations of the designated tile 402.

Figure 5:
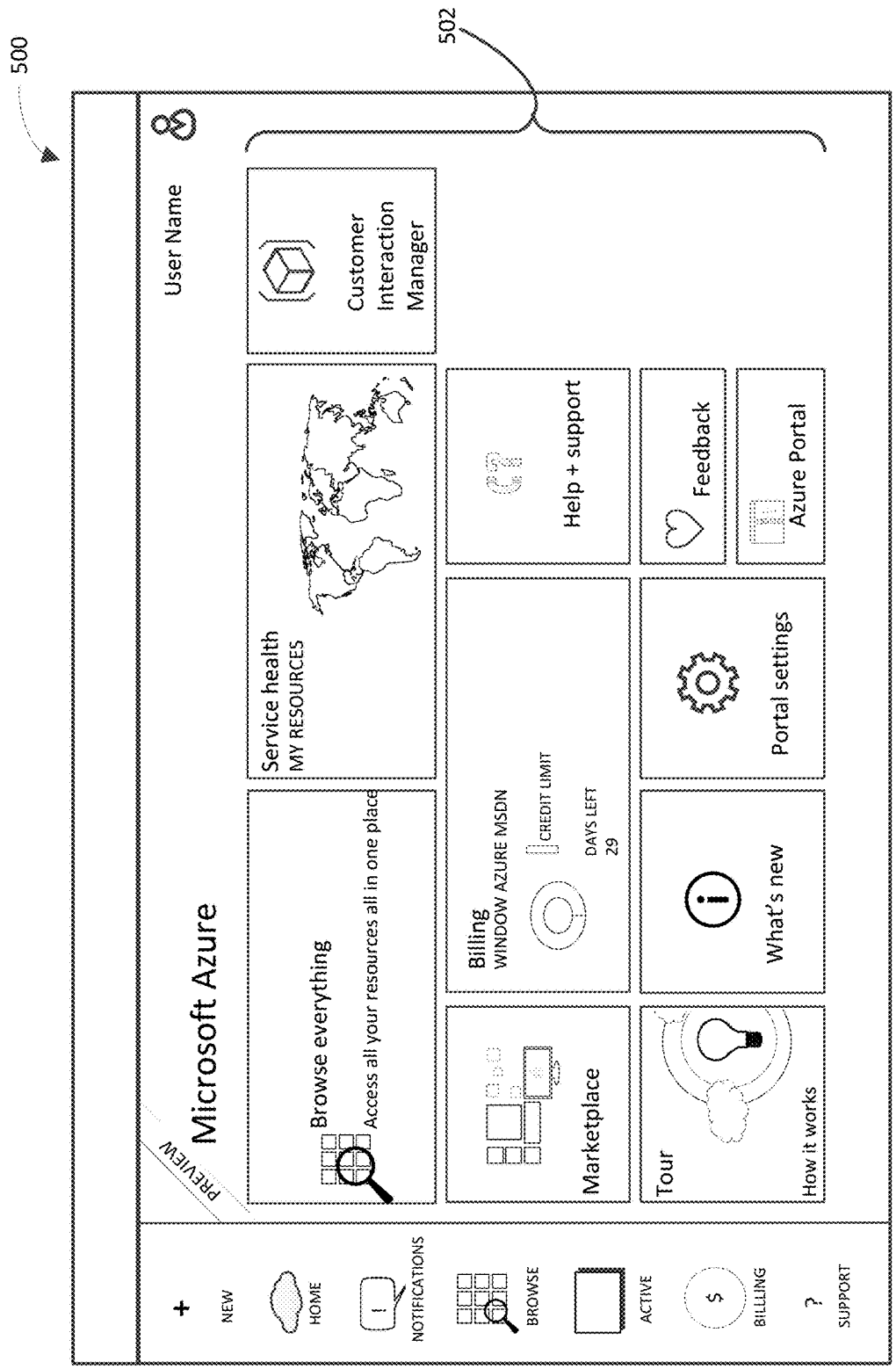

FIGS. 5-19 are example screenshots 500, 600, 700. 800, 900, 1000, 1100, 1200, 1300, 1400, 1500, 1600, 1700, 1800, 1900 of an application in accordance with embodiments. In FIG. 5, screenshot 500 provides a top-level view of a portal of an application. The portal is identified as the Azure® Preview Portal, developed and distributed by Microsoft Corporation, for illustrative purposes. Screenshot 500 shows UI representations of tiles 502 labeled as follows: "Browse everything–Access all your resources all in one place", "Service health–MY RESOURCES", "Custom Interaction Manager", "Marketplace", "Billing–WINDOWS AZURE MSDN–VISUAL STUDIO ULTIMATE; CREDIT LEFT 149.06 USD; DAYS LEFT 29", "Help+support", "Tour– How it works", "What's new", "Portal settings", "Feedback", and "Azure Portal". The tile labeled "Browse everything–Access all your resources all in one place" will be referred to as the "Browse" tile in the following discussion of the screenshots shown in FIGS. 5-19.

The "Browse" tile is configured to initiate display of a tile gallery (e.g., the gallery 200 shown in FIG. 2) in response to selection of the "Browse" tile. For instance, a user may select the "Browse" tile by clicking on or hovering over the UI representation of the "Browse" tile on the screen or by performing another action (e.g., gesture, gaze, voice command) to indicate selection of the "Browse" tile.

Figure 6:
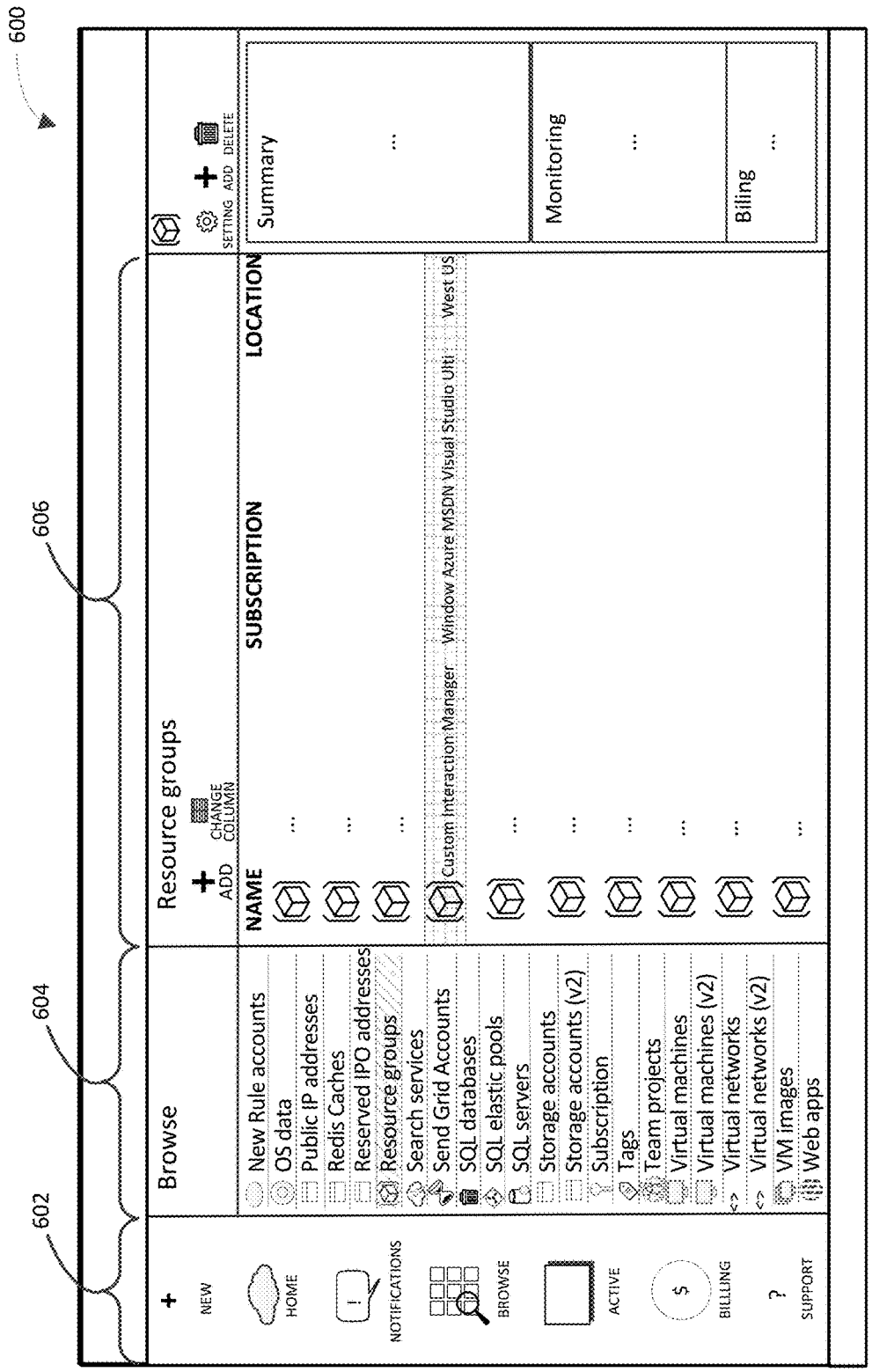

In FIG. 6, screenshot 600 shows a result of selecting the "Browse" tile from the various tiles shown in FIG. 5. In particular, screenshot 600 shows three columns 602, 604, 606 of information. A first column 602 includes hubs. The hubs are labeled "HOME", "NOTIFICATIONS", "BROWSE", "ACTIVE", "BILLING", and "SUPPORT". Each of the hubs is configured to initiate functionality associated with the hub in response to selection of the hub by the user (e.g., in response to the user clicking on the hub). The first column 602 includes an icon labeled "NEW", which enables a user of the application to create "Resources" that are available for creation via the portal of the application.

A second column 604 is labeled "Browse". The second column 604 includes UI representations that specify respective resources, each of which may be selected by the user (e.g., by clicking on the UI representation of the resource). The UI representations of the resources are labeled as "New Rule accounts", "OS data", "Public IP addresses", "Redis Caches", "Reserved IPO addresses", "Resource groups", "Search services", "SendGrid Accounts", "SQL databases", "SQL elastic pools", "SQL servers", "Storage accounts", "Storage accounts (v2)", "Subscription", "Tags", "Team projects", "Virtual machines", "Virtual machines (v2)", "Virtual networks", "Virtual networks (v2)", "VM images", and "Web apps". In the second column 604, "Resource groups" is shown to be selected.

The third column 606 is labeled "Resource groups", resulting from "Resource groups" being selected in the second column 604. The third column 606 includes a list of resource groups, each of which is selectable by the user. The third column 606 also indicates a subscription and a location for each of the resource groups. In the third column 606, a resource group labeled "Custom Interaction Manager" is shown to be selected.

Figure 7:
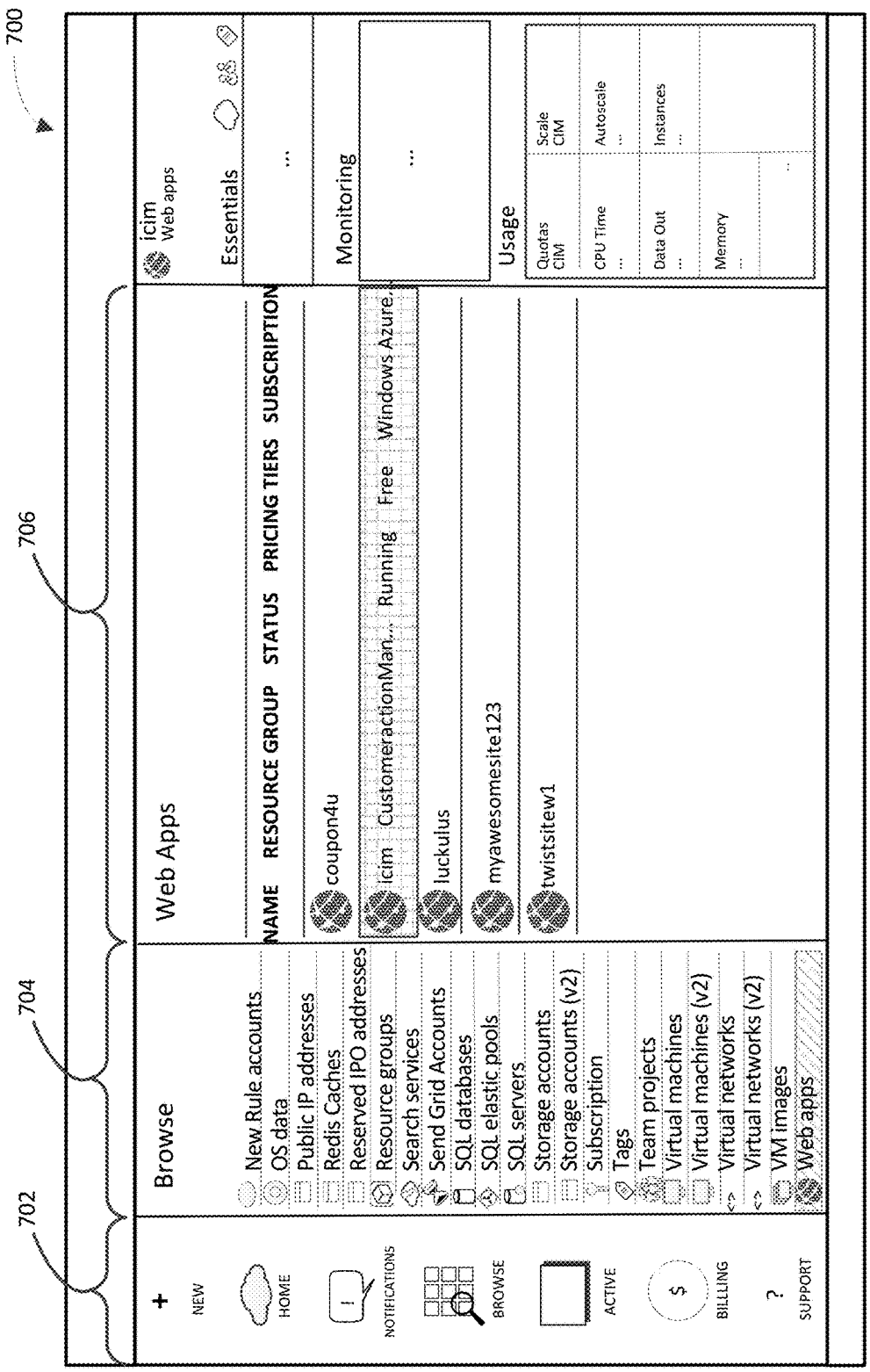

In FIG. 7, screenshot 700 also shows the result of selecting the "Browse" tile from the various tiles shown in FIG. 5. Screenshot 700 shows three columns 702, 704, 706 of information in a similar manner to screenshot 600 of FIG. 6. However, in FIG. 7, "Web Apps" (rather than "Resource groups") is show to be selected in the second column 704.

Accordingly, the third column 706 is labeled "Web Apps", resulting from "Web Apps" being selected in the second column 704. The third column 706 includes a list of web applications, each of which is selectable by the user. The third column 706 also indicates a resource group, a status, a pricing tier, and a subscription for each web application. In the third column 706, a web application labeled "icim" is shown to be selected. The icim web application is indicated to belong to the "Custom Interaction Manager" resource group; the status of the icim web application is "running"; and the icim web application is indicated to be free for illustrative purposes.

Figure 8:
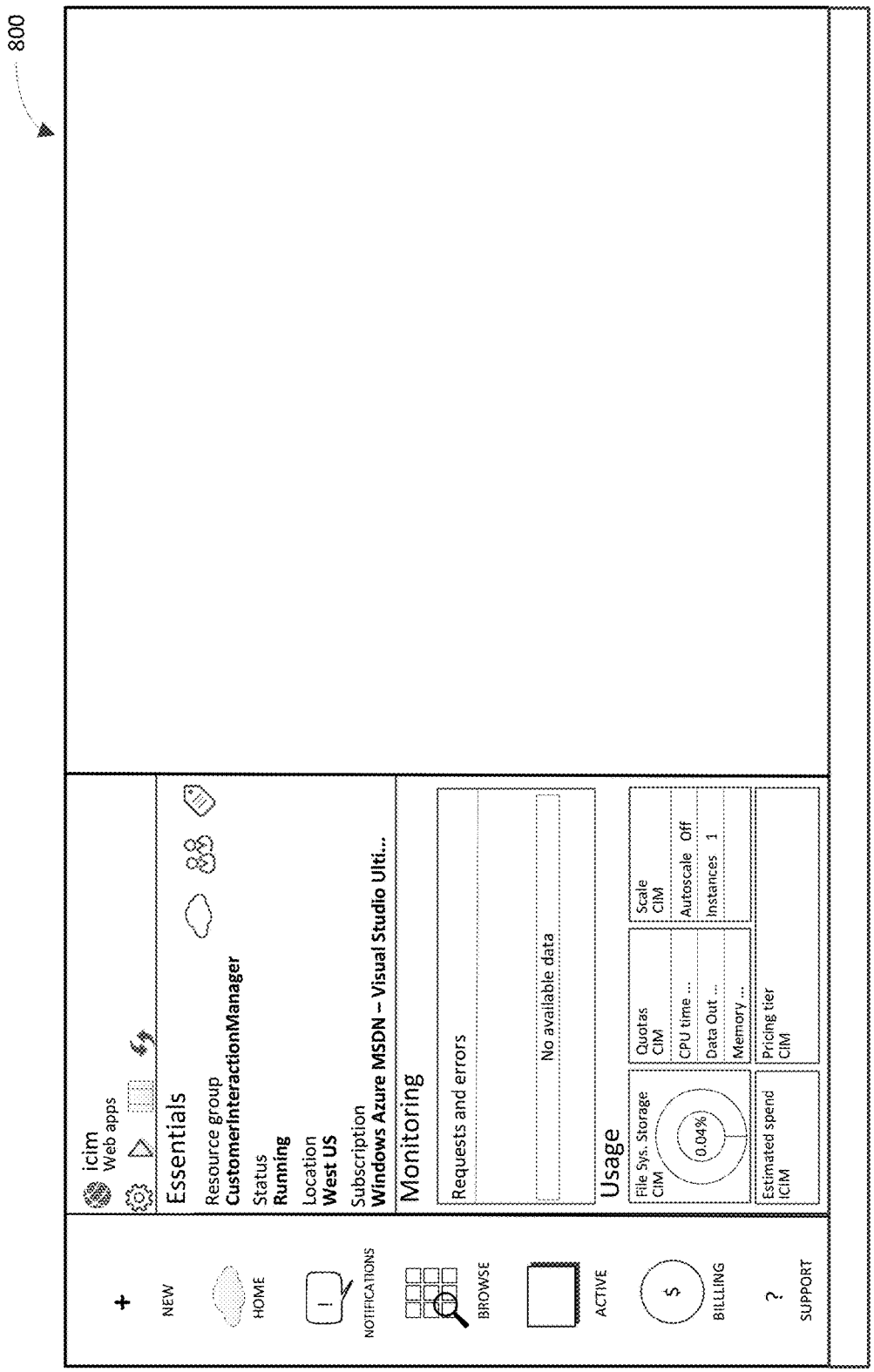

In FIG. 8, screenshot 800 shows a result of selecting the icim web application from the various web applications shown in FIG. 7. Accordingly, screenshot 800 shows information regarding the icim web application. The information is categorized under three headings: "Essentials", "Monitoring", and "Usage". The "Essential" information indicates a resource group to which the icim web application belongs, a status, a location, a subscription group, a subscription ID, a uniform resource locator (URL), and other information regarding the icim web application. The "Monitoring" information indicates that "Requests and errors" are being monitored. The "Usage" information indicates an amount of file system storage consumed by the icim web application, estimated spend, quotas, CPU time, Data out, Memory, Scale, Pricing tier, and other information regarding the icim web application. For instance, the "Usage" information indicates that autoscale is turned off and that the icim web application has one instance. The screen shown in FIG. 8 may be used to create a website for the icim web application, for example.

Figure 9:
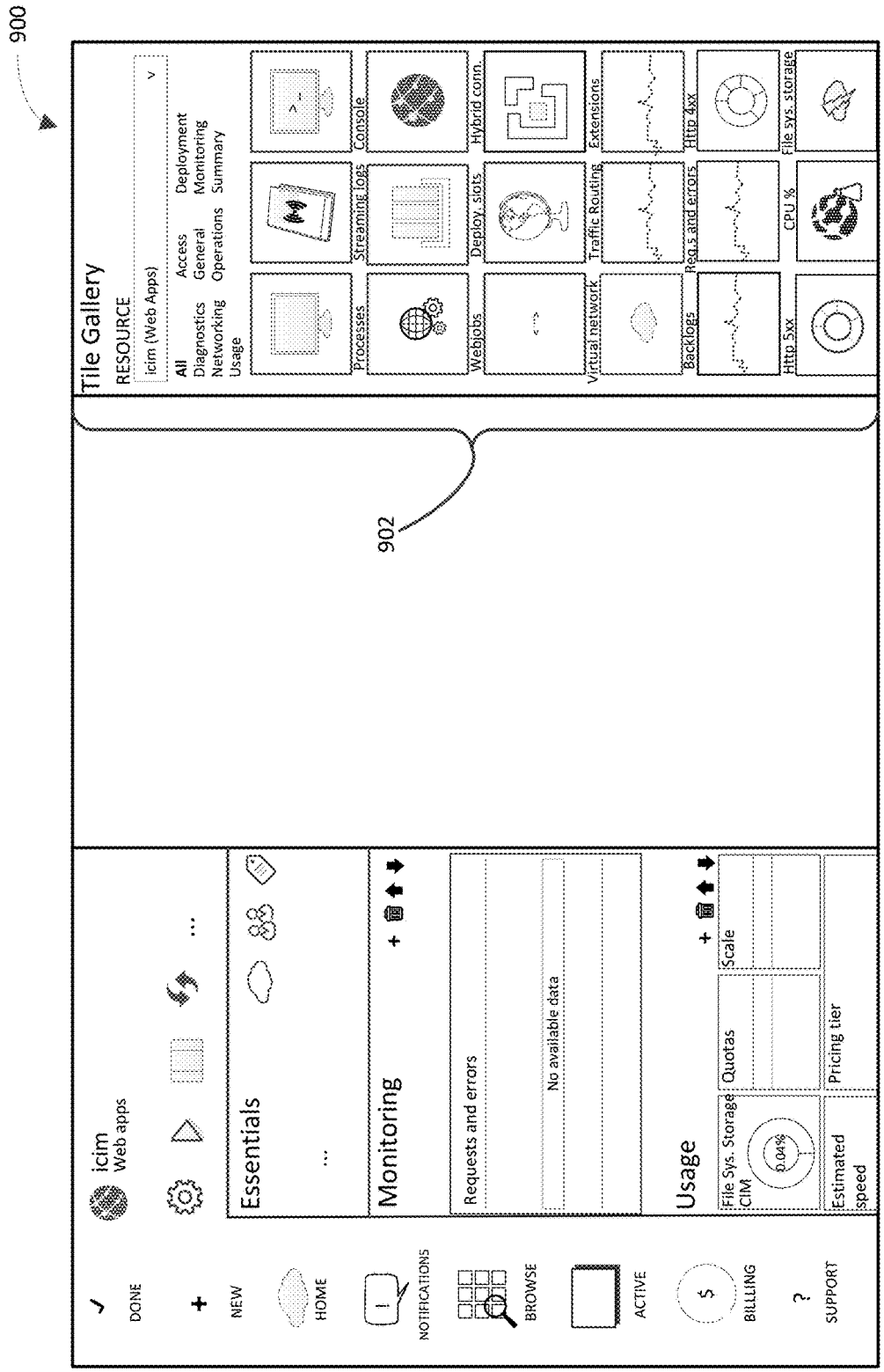

In FIG. 9, screenshot 900 shows a UI representation of a pivot-based tile gallery 902, which includes all tiles for the icim web application. In the pivot-based tile gallery 902, the category of "All" is selected, causing UI representations of all the tiles for the icim web application to be presented in the pivot-based tile gallery 902. It will be recognized that some of the tiles may not be seen on the screen due to a size of the screen. However, a scrolling, paging, or other function may be utilized to cause others of the UI representations to be shown on the screen.

Figure 10:
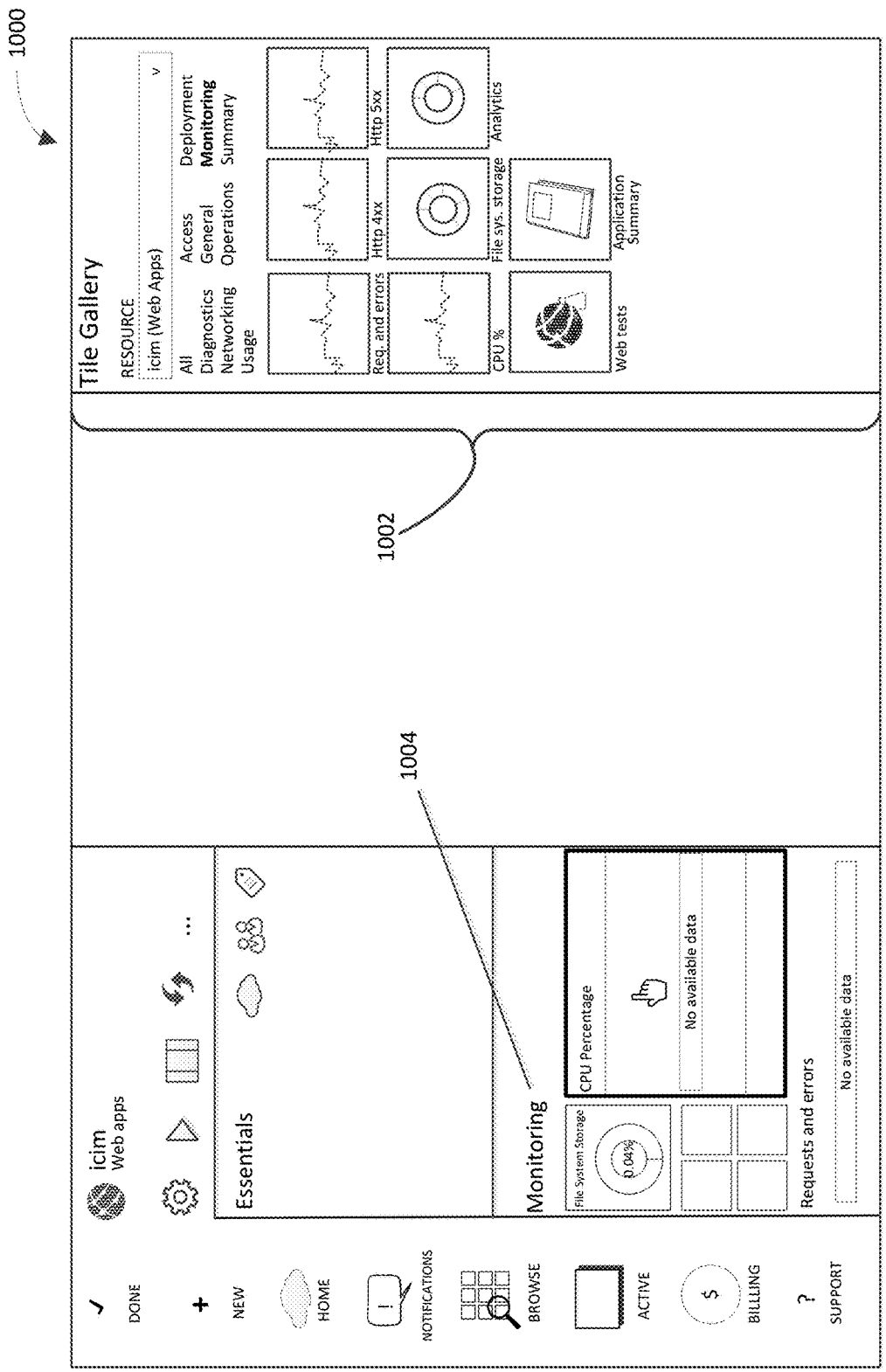

In FIG. 10, screenshot 1000 shows a UI representation of a pivot-based tile gallery 1002 in which the category of "Monitoring" is selected, causing UI representations of the tiles for the icim web application that are included in the "Monitoring" category to be presented in the pivot-based tile gallery 1002. UI representations of tiles for the icim web application that are not included in the "Monitoring" category are not presented in the pivot-based tile gallery 1002. Any of the UI representations of the tiles shown in the pivot-based tile gallery 1002 may be dragged and dropped under the "Monitoring" heading 1004 on the screen to cause metrics associated with the tile to be added to a monitoring website associated with the icim web application.

Figure 11:
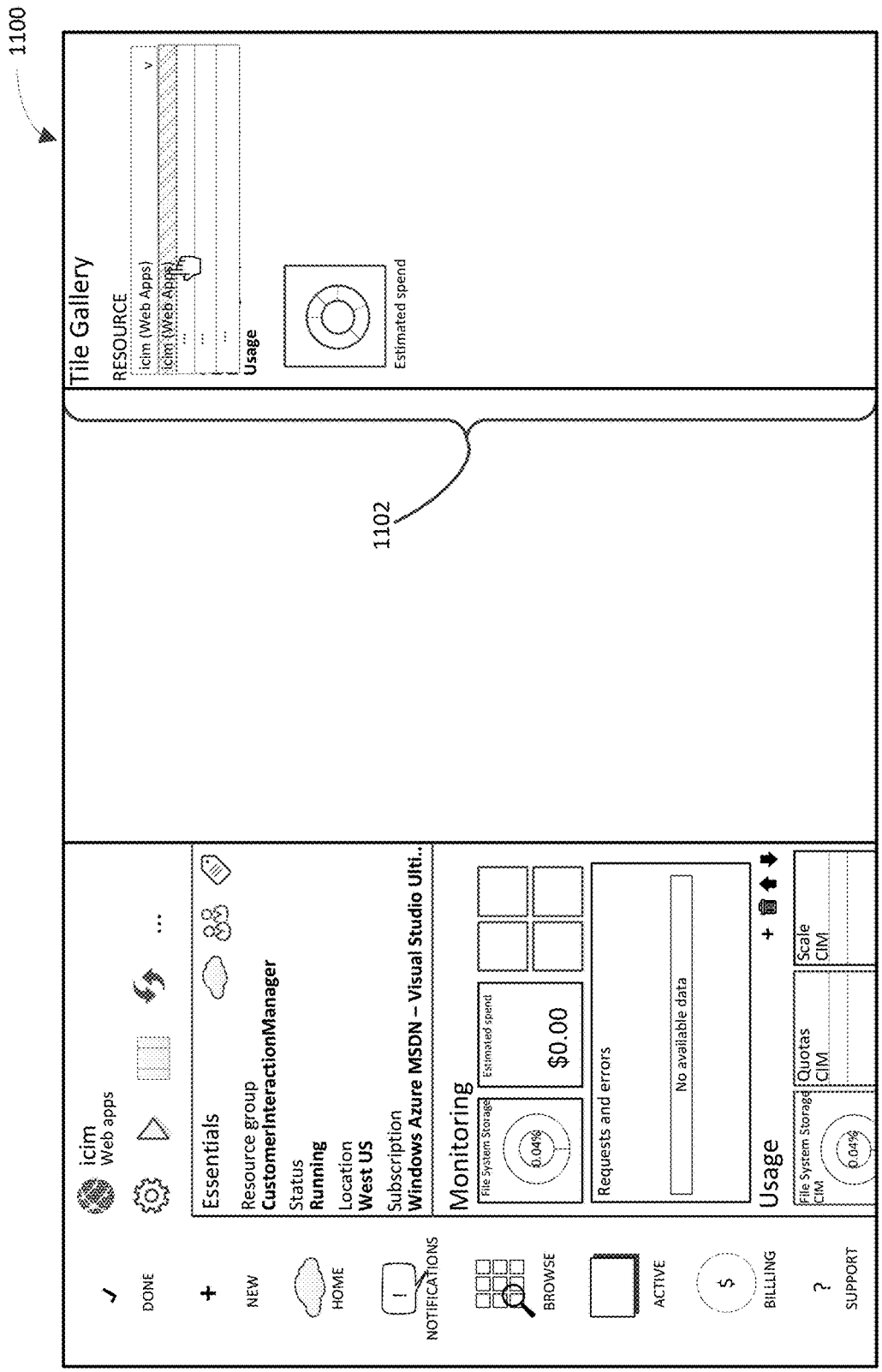

In FIG. 11, screenshot 1100 shows a UI representation of a pivot-based tile gallery 1102 in which the category of "Usage" is selected, causing a UI representation of the sole tile for the icim web application that is included in the "Usage" category to be presented in the pivot-based tile gallery 1102. UI representations of tiles for the icim web application that are not included in the "Usage" category are not presented in the pivot-based tile gallery 1102.

Figure 12:
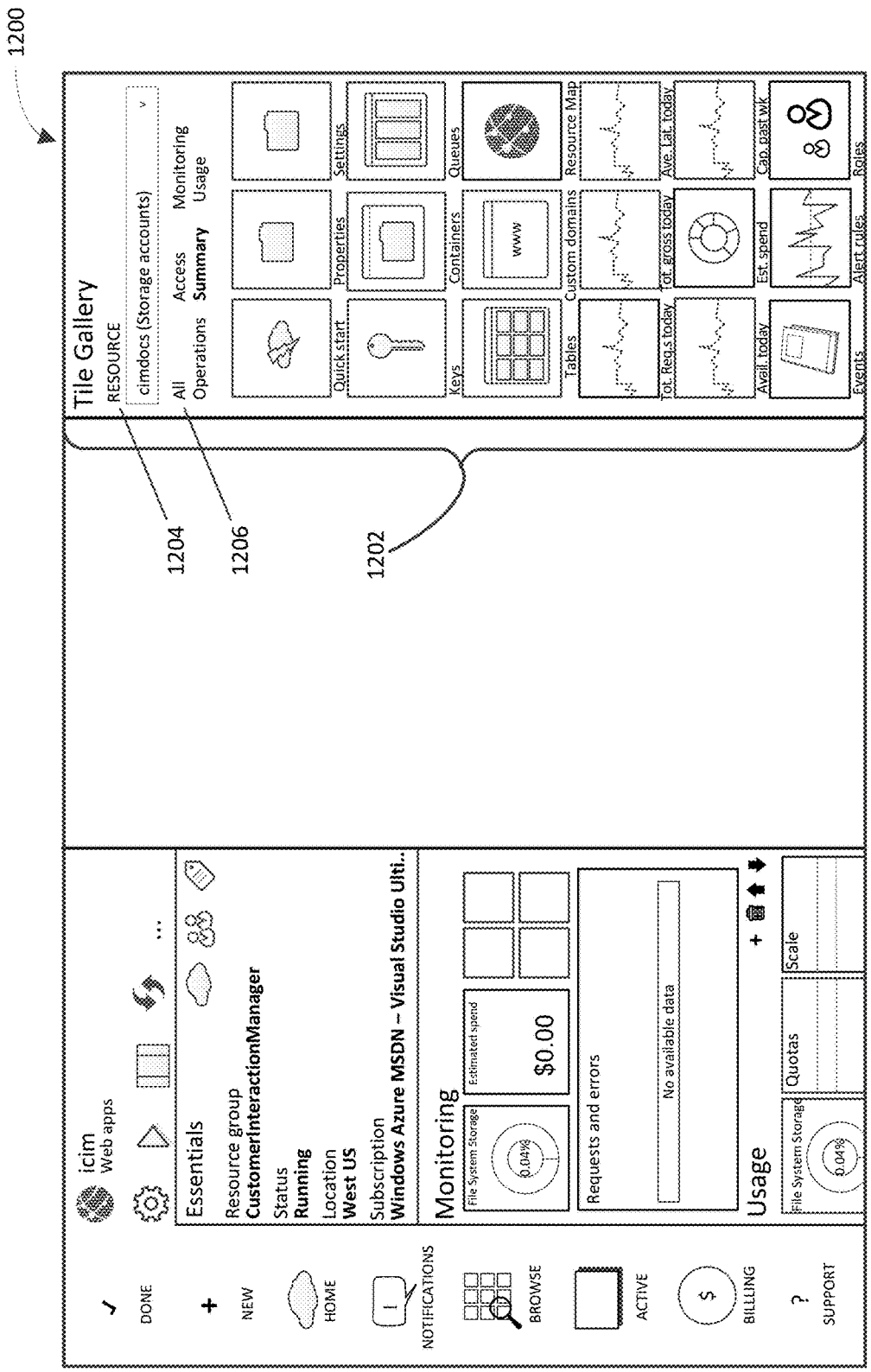

In FIG. 12, screenshot 1200 shows a UI representation of a pivot-based tile gallery 1202 in which a first pivot 1204 has been used to change the selected resource from the icim web application to a cimdocs storage account. A second pivot 1206 has been used to select a "Summary" category. Accordingly, the UI representation of the pivot-based tile gallery 1202 includes UI representations of tiles for the cimdocs storage account that correspond to the "Summary" category.

Figure 13:
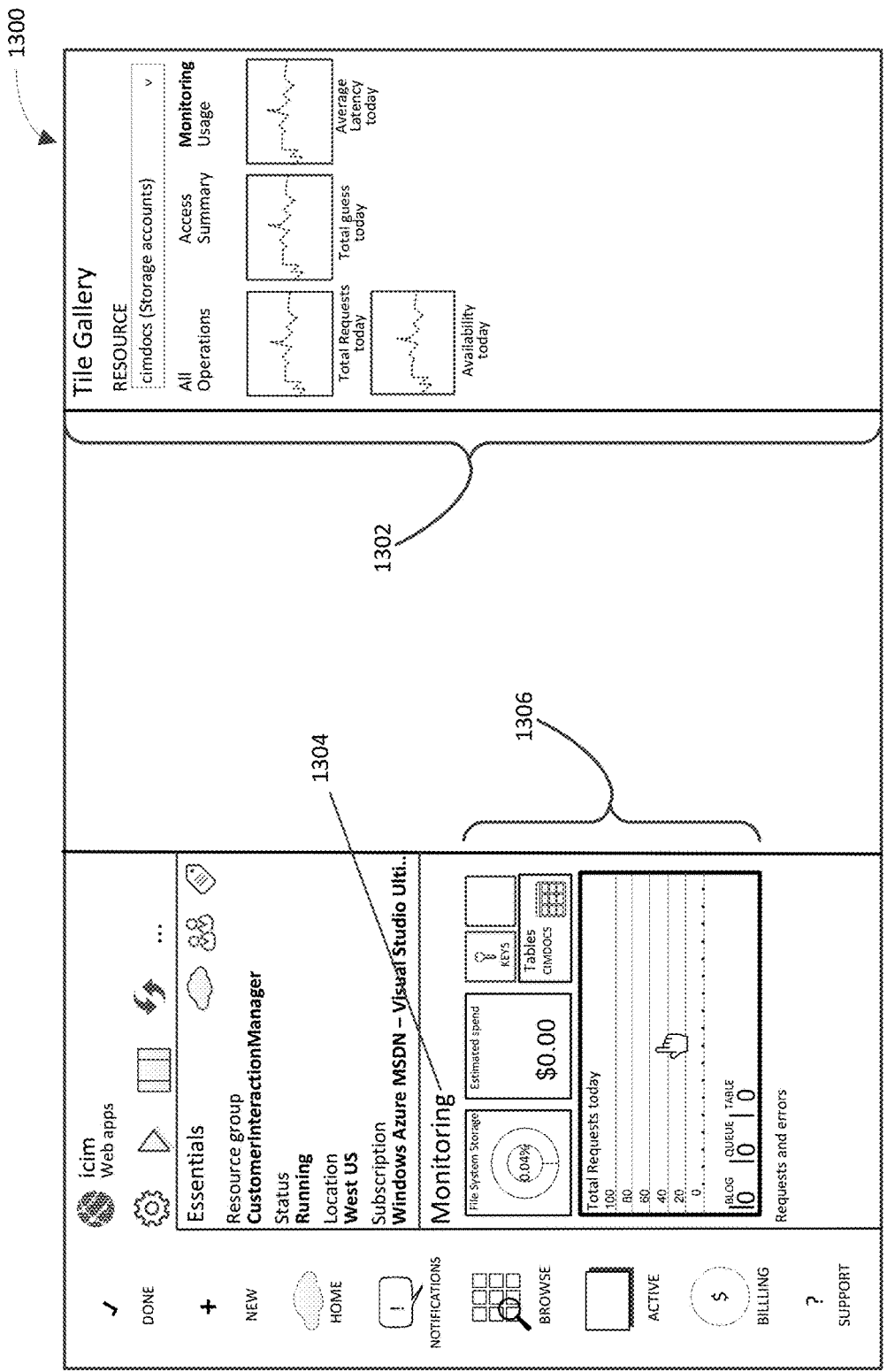

In FIG. 13, screenshot 1300 shows a UI representation of a pivot-based tile gallery 1302 in which the category of "Monitoring" is selected, causing UI representations of the tiles for the cimdocs storage account that are included in the "Monitoring" category to be presented in the pivot-based tile gallery 1302. UI representations of tiles for the cimdocs storage account that are not included in the "Monitoring" category are not presented in the pivot-based tile gallery 1302.

It will be recognized that some of the UI representations of the tiles for the cimdocs storage account that are included in the "Monitoring" category have been dragged and dropped under the "Monitoring" heading 1304 on the screen, causing the UI representations of those tiles 1306 to be removed from the pivot-based tile gallery 1302 and inserted under the "Monitoring" heading 1304. Inclusion of the tiles 1306 under the "Monitoring" heading indicates that metrics associated with the tiles 1306 are to be added to a monitoring website associated with the cimdocs storage account.

Figure 14:
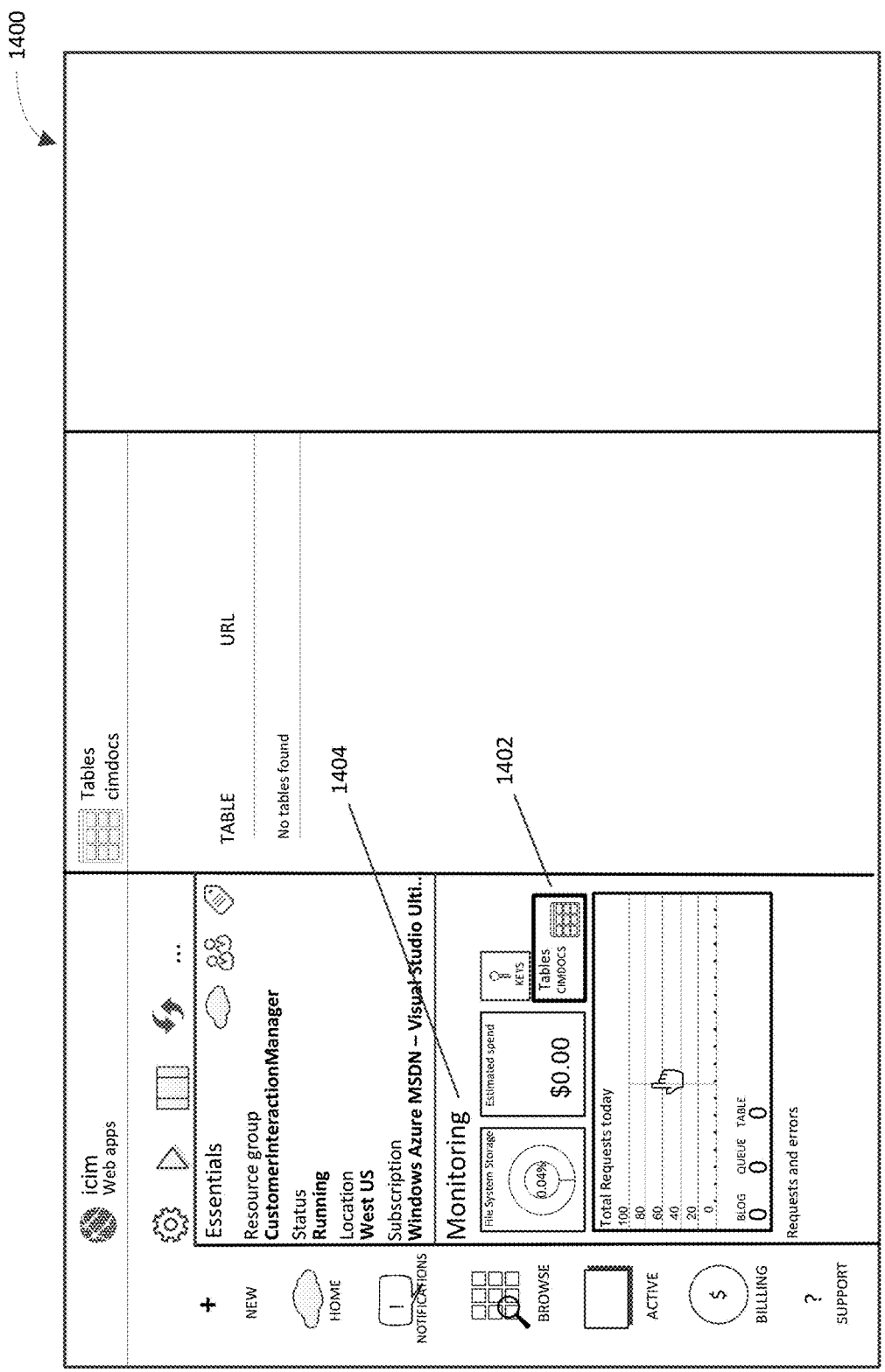

In FIG. 14, screenshot 1400 shows that a UI representation of tables for the cimdocs storage account is selected under the "Monitoring" heading, causing a list of tables that are associated with the cimdocs storage account to be displayed on the screen. As shown in FIG. 14, no tables are associated with the cimdocs storage account.

Figure 15:
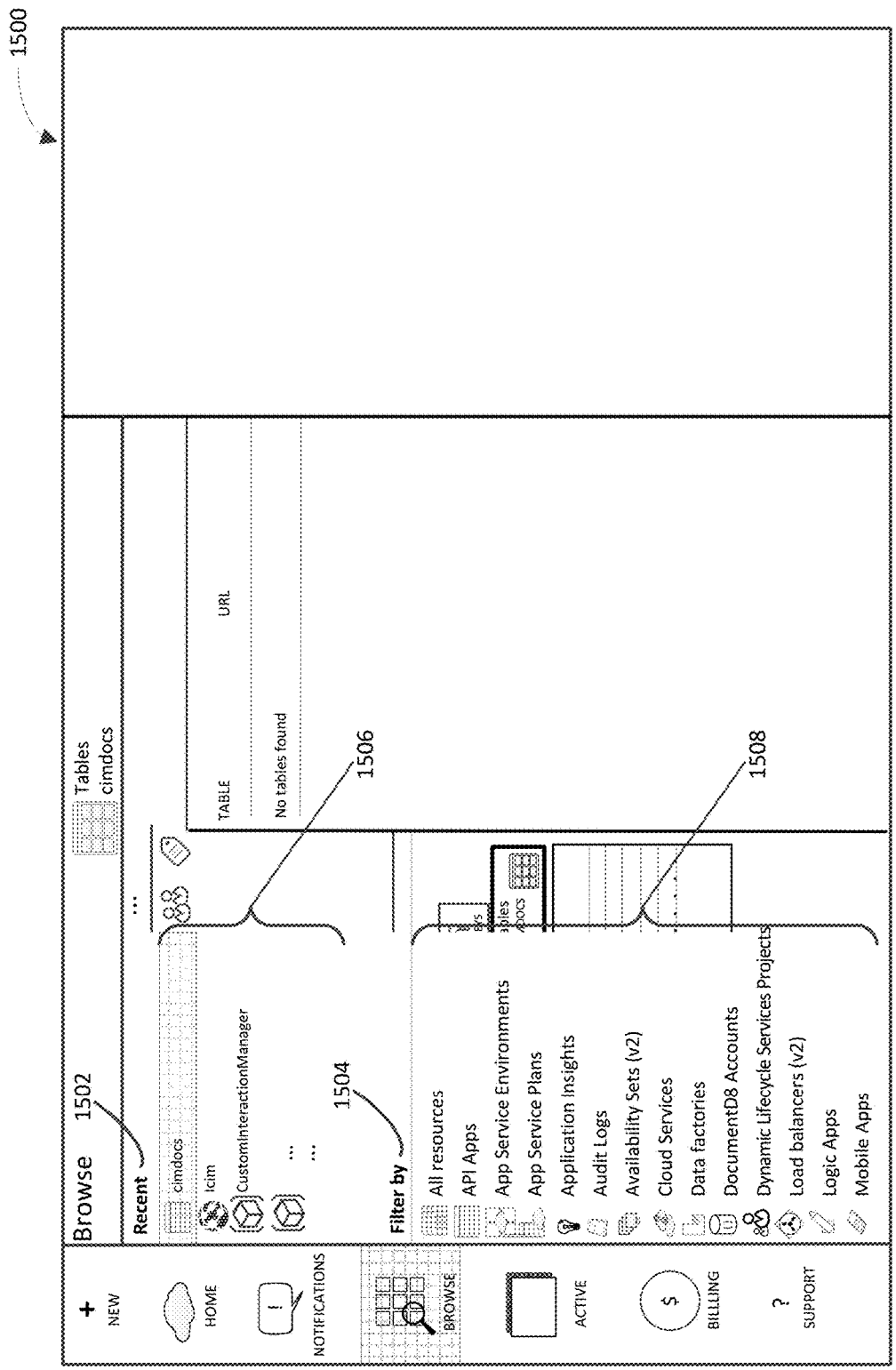

In FIG. 15, screenshot 1500 shows a list of recently selected resources 1506. The list includes cimdocs, icim, Custom Interaction Manager, and other resources for illustrative purposes. A first pivot 1502 may be used to select a resource from the list of recently selected resources 1506, though the scope of the example embodiments is not limited in this respect.

Screenshot 1500 also shows a list of filters 1508 that may be applied when browsing for resources. The filters 1508 are labeled as follows: "All resources", "API Apps", "App Service Environments", "App Service plans", "Application Insights", "Audit Logs", "Availability Sets (v2)", "Cloud Services", "Data factories", "DocumentD8 Accounts", "Dynamic Lifecycle Services Projects", "Load balancers (v2)", "Logic Apps", and "Mobile Apps" for illustrative purposes. A second pivot 1504 may be used to select a filter from the list of filters 1508, though the scope of the example embodiments is not limited in this respect.

Figure 16:
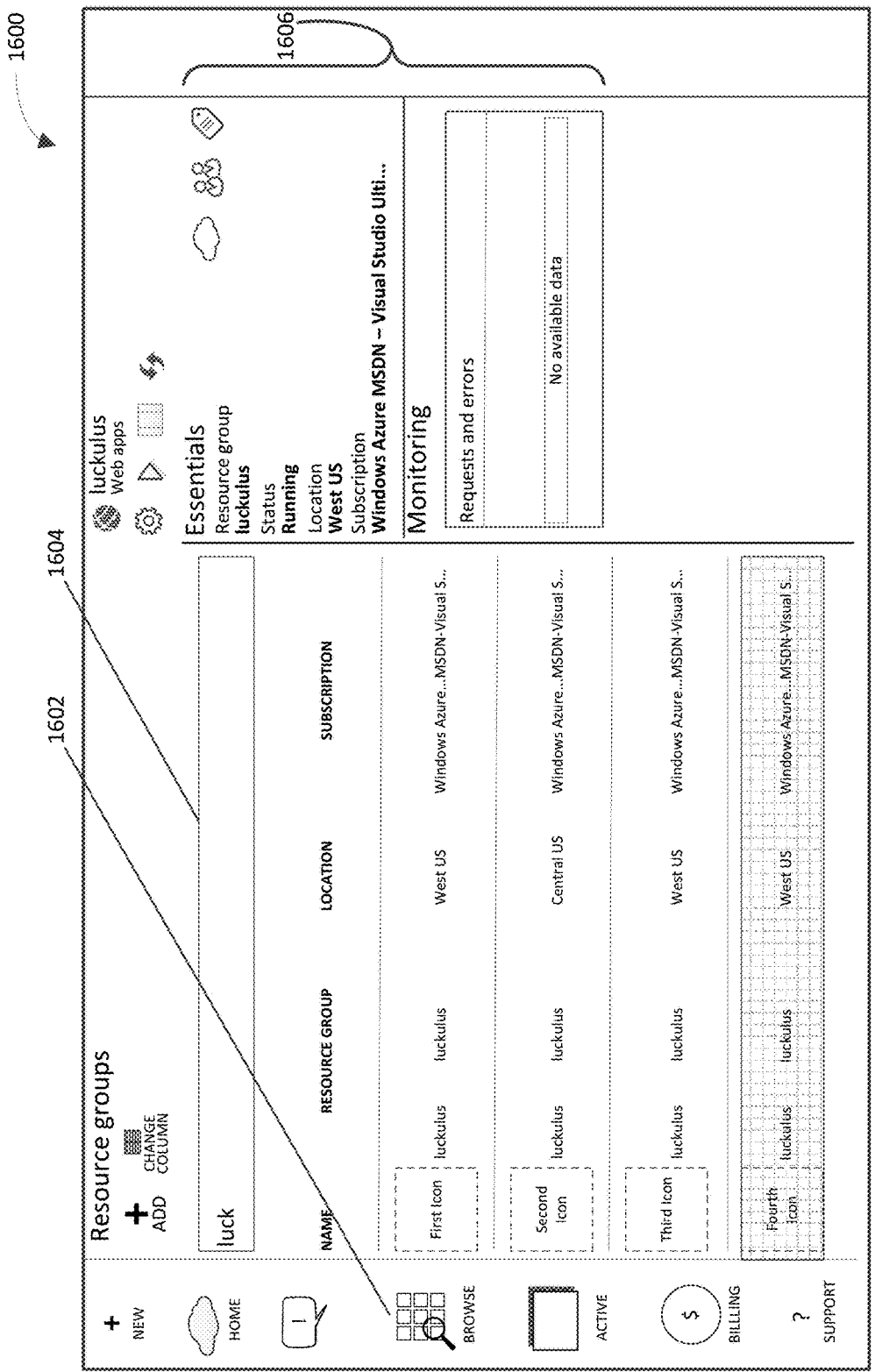

In FIG. 16, screenshot 1600 shows information regarding a luckulus web application. For instance, a "Browse" hub 1602 may be selected to cause a search bar 1604 to be displayed on the screen. As shown in FIG. 16, a user has typed the character string "luck" in the search bar 1604, causing all resource groups having a name that includes the character string "luck" to be displayed below the search bar 1604. The user has selected the fourth resource group that is displayed below the search bar 1604, causing information 1606 regarding the fourth resource group to be displayed on the screen. The information 1606 is categorized under two headings: "Essential" and "Monitoring". The "Essential" and "Monitoring" information in FIG. 16 is similar to the "Essential" and "Monitoring" information described above with reference to FIG. 8. The screen shown in FIG. 16 may be used to create a website for the luckulus web application, for example.

Figure 17:
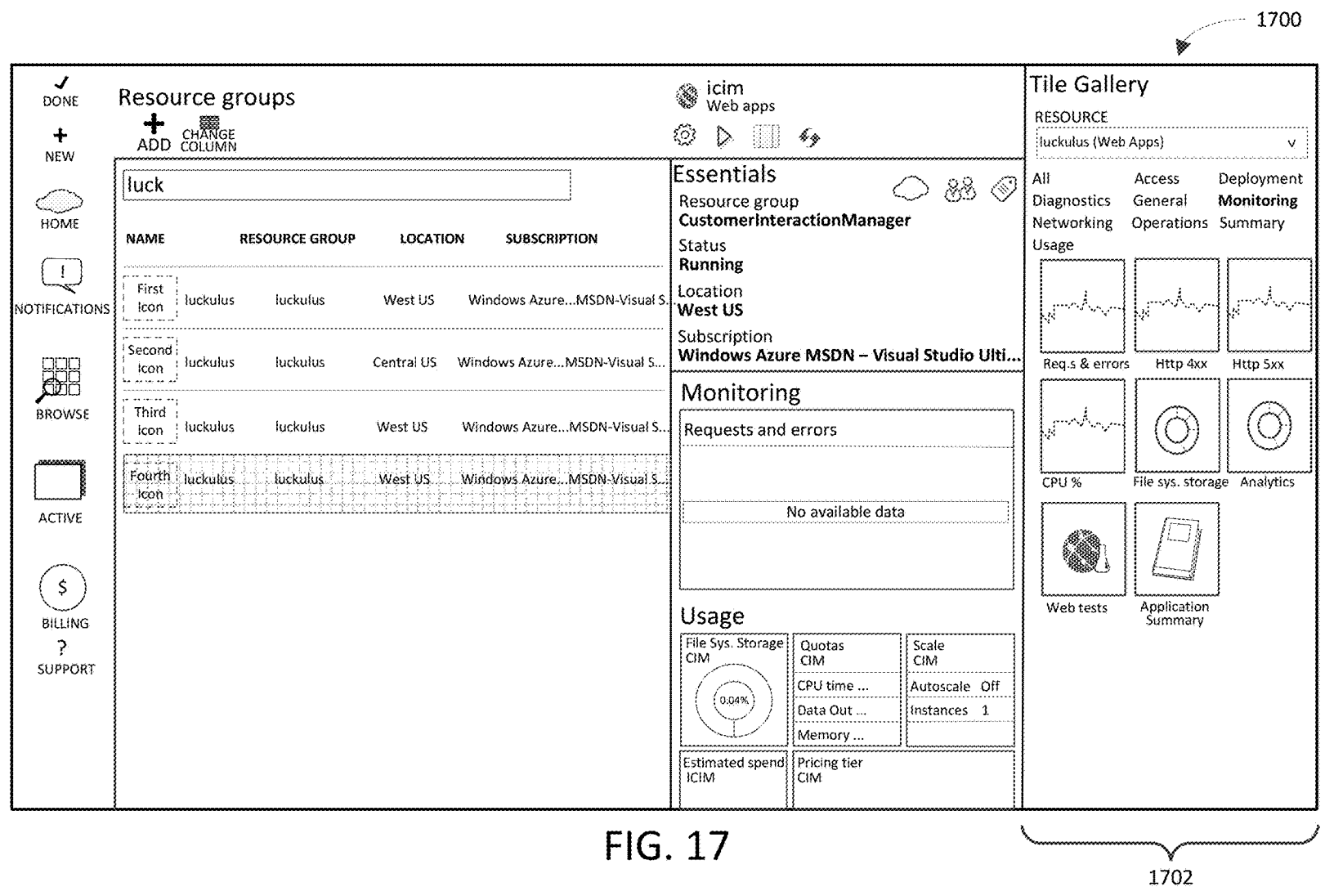

In FIG. 17, screenshot 1700 shows a UI representation of a pivot-based tile gallery 1702 in which a "Monitoring" tile category filter has been selected. Accordingly, the pivot-based tile gallery 1702 includes UI representations of tiles for the luckulus web application that correspond to the "Monitoring" category. UI representations of tiles for the luckulus web application that do not correspond to the "Monitoring" category are not included in the pivot-based tile gallery 1702.

Figure 18:
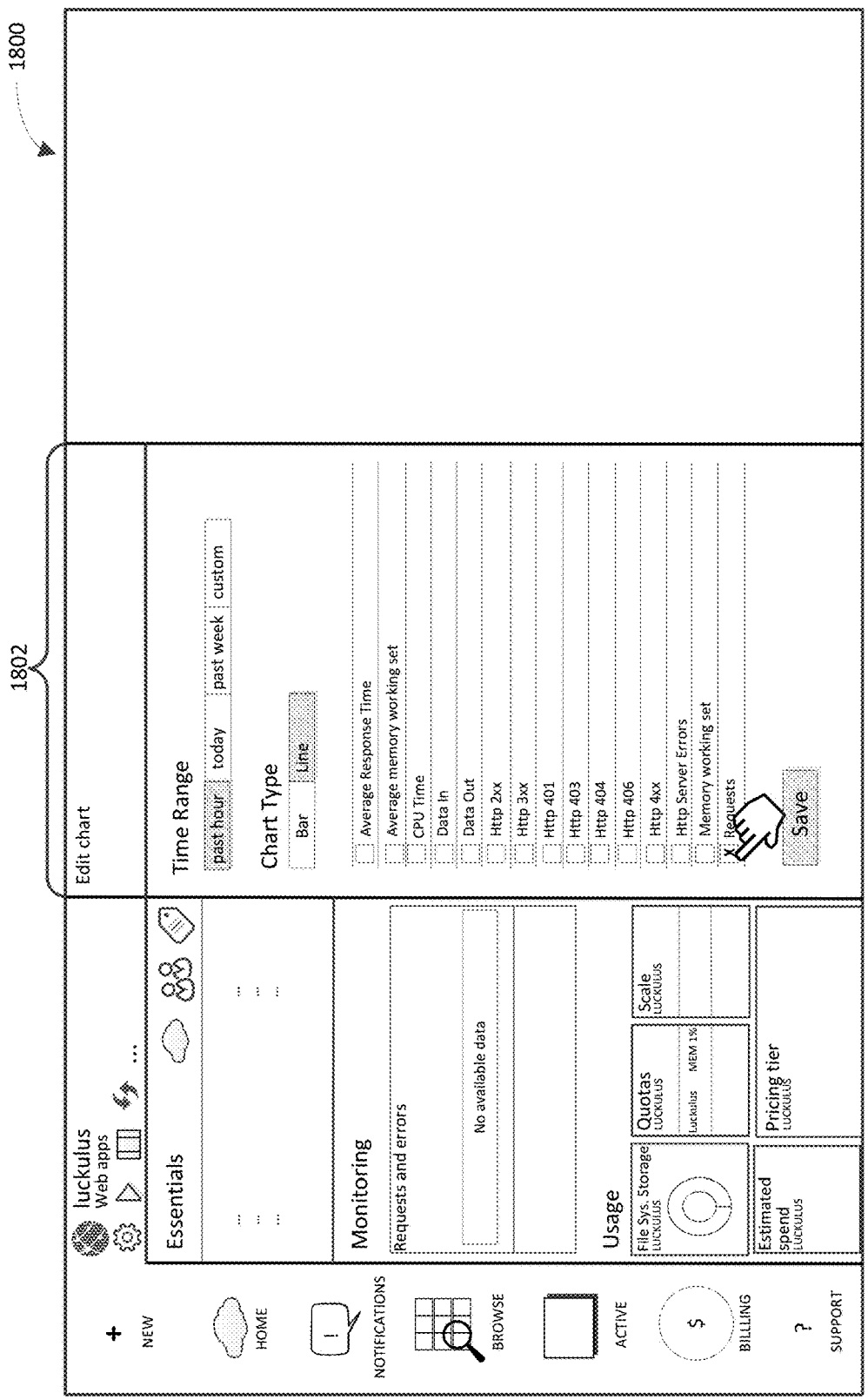

FIG. 18 shows an "Edit Chart" column 1802 that includes various options that may be selected to create and/or edit a chart that is associated with the luckulus web application. The column 1802 includes two headings: "Time Range" and "Chart type". Under the "Time Range" heading, the following selectable options are shown: "past hour", "today", "past week", "custom". The "past hour" option is shown to be selected for illustrative purposes. Under the "Chart type" heading, the options of "Bar" and "Line" are provided. The "Line" option is shown to be selected for illustrative purposes. A list of other selectable options is provided, as well. The list includes "Average Response Time", "Average memory working set", "CPU time", "Data In", "Data Out", "Http 2xx", "Http 3xx", "Http 401", "Http 403", "Http 404", "Http 406", "Http 4xx", "Http Server Errors", "Memory working set", and "Requests". The "Requests" option is shown to be selected for illustrative purposes. A "Save" button is shown near the bottom of the column to enable selected options to be saved.

The example techniques described herein may be applicable to a portal of an application. For instance, the example techniques may be applicable to building a management portal of an application. One example portal to which the example techniques may be applicable is Azure® Preview Portal, developed and distributed by Microsoft Corporation. Azure® Preview Portal operates like an operating system shell (e.g., in a browser), so that multiple tasks may run at the same time from various parties. The application may provide functionality that enables a user of the application to personalize the portal. For instance, the user may start an area, change a look and feel of the area, configure the portal to provide desired information at a desired time, etc.

Resource groups may serve as containers for respective subsets of resources. For example, if a developer is creating an application (e.g., Custom Introduction Manager, CRM, or ERP), the developer may create a resource group and put a website, a database, document(s), and/or other resource(s) in the resource group. In accordance with this example, placing the aforementioned resources in the same resource group may help the developer to manage the resources together. The resources may be manifested in the portal via a resource screen. A screen is also referred to as a "blade". A resource screen is one of a variety of types of a screen that may be manifested in the portal. A resource blade is a blade that represents a resource (e.g., an application or portion thereof, a website, or a database). The resource blade may show command(s) and/or tile(s). Tiles in the resource blade may correspond to different aspects of the same resource. For instance, tiles may show metrics, including but not limited to requests and errors, memory consumption, CPU consumption, ingress, egress, etc. A tile may provide access to operations, including but not limited to alerts, information regarding a cost of a website, information regarding related resources (e.g., resources that are part of the same application), etc.

The resource blade may have a limited set of tiles. For instance the number of tiles may be set to be no greater than a threshold number. It may be desirable to not put everything that is available for a website in the same screen. Accordingly, the tiles that are included in the resource blade may be the tiles that are deemed to be the most important. A user may select the tiles that are included in the resource blade.

Tiles may be used to reach respective resource blades. When a user is creating a website, the user may select the tiles that correspond to the metrics (e.g., charts, functions) that are desired for the website. The website may coexist with a database and/or a storage account. For instance, data associated with the website may be stored in the database.

The tile gallery may be used to add a tile that corresponds to a resource. If the resource is included in a resource group, the tile gallery may include tiles for the various (e.g., all) resources in the resource group. For instance, a user who is developing a website may want to see errors associated with the website, how many requests are received for a database that is associated with the website, etc. on the same blade. Tables can be used to display such information in the blade. The tables may indicate information that is specific to a particular resource or particular to a group (e.g., type) of resources, for example.

By default, the tile gallery may include tiles that pertain to a selected resource. A pivot may be used to display tiles associated with other resources in the tile gallery. Such other resources may be resources in the same resource group, resources that are included in the same application, etc.

When an author (e.g., extension developer) creates tiles, the author may create a tile catalog. A tile may include a HTML template, a view model (e.g., a code artifact), and metadata. For example, the HTML template may indicate that a blade is to include a chart. The view model may react to the application and provide UIs. For instance, the view model may provide data and behaviors. Accordingly, the view model may describe how the tile is going to look, how the tile is going to behave, etc. The view model may declare a set of properties that are put in the HTML template. The metadata may describe how the tile is going to surface in the tile gallery. For instance, the metadata may describe an icon that is to be shown with regard to the tile, a title of the tile, etc.

The tiles may be configured to receive very rich inputs. For instance, if a tile represents a website, then a source identifier (ID), data from the environment, etc. may be provided as inputs to the tile. When a tile is added (e.g., in a workspace) from the tile gallery, some of that context may be lost. For instance, all of the context, except for the source ID, may be lost. The techniques described herein may be capable of inferring properties (e.g., the type) associated with the tile. For example, a tile may be included in a tile catalog. If the tile does not have a desired interface, the tile may be wrapped in a wrapper to provide the desired interface. By wrapping the tile, a public interface that is adequate for the context in which the tile is going to run may be provided. The wrapper may be the code that declares the public interface. The resulting adapted tile can map inputs of the tile to inputs of the adapted tile. For instance, if a website ID is received as input for the tile, the adapted tile may run code and create a complex query to obtain a chart that provides the input in an appropriate format.

Figure 19:
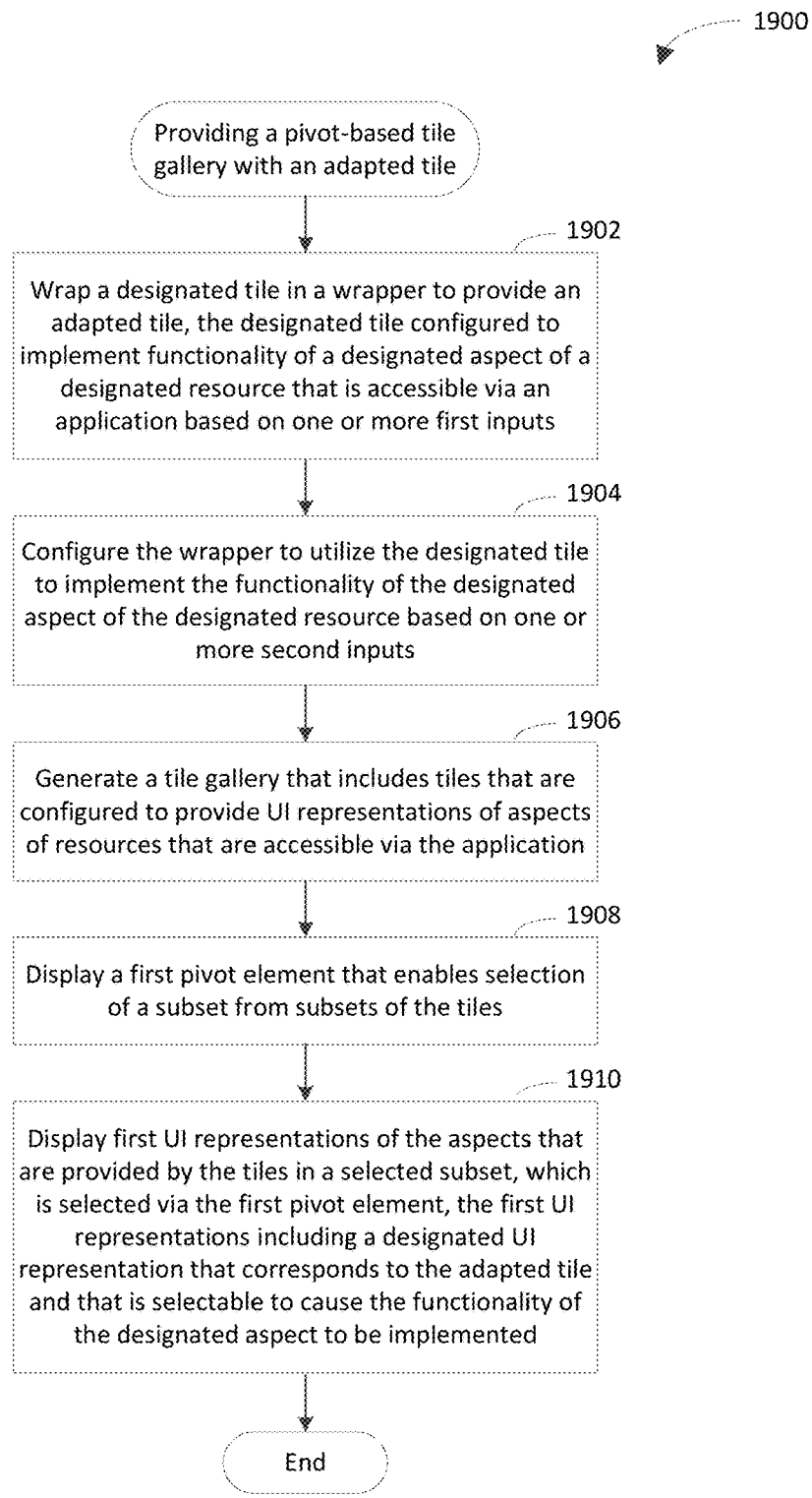
FIGS. 19-20 depict flowcharts of example methods for providing a pivot-based tile gallery with an adapted tile in accordance with embodiments.
Figure 20:
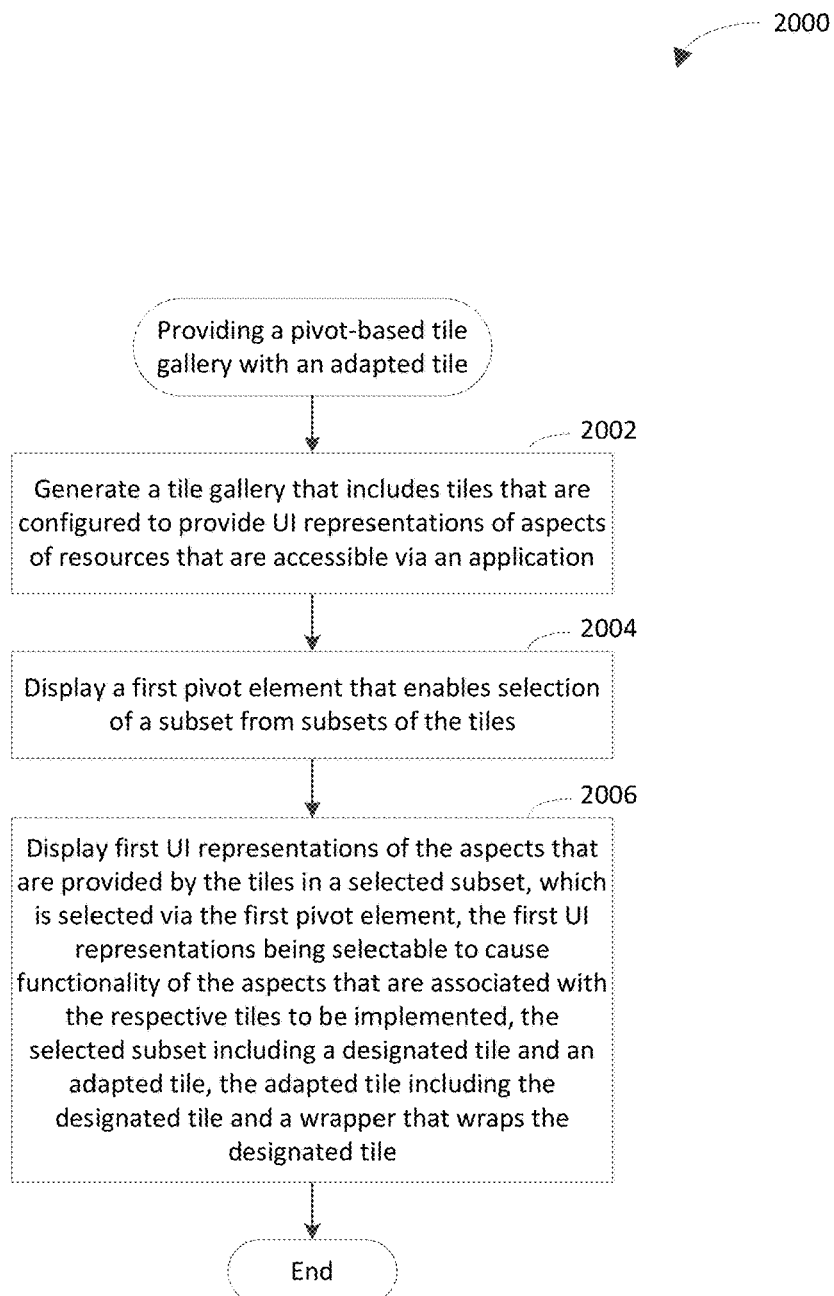
Figure 21:
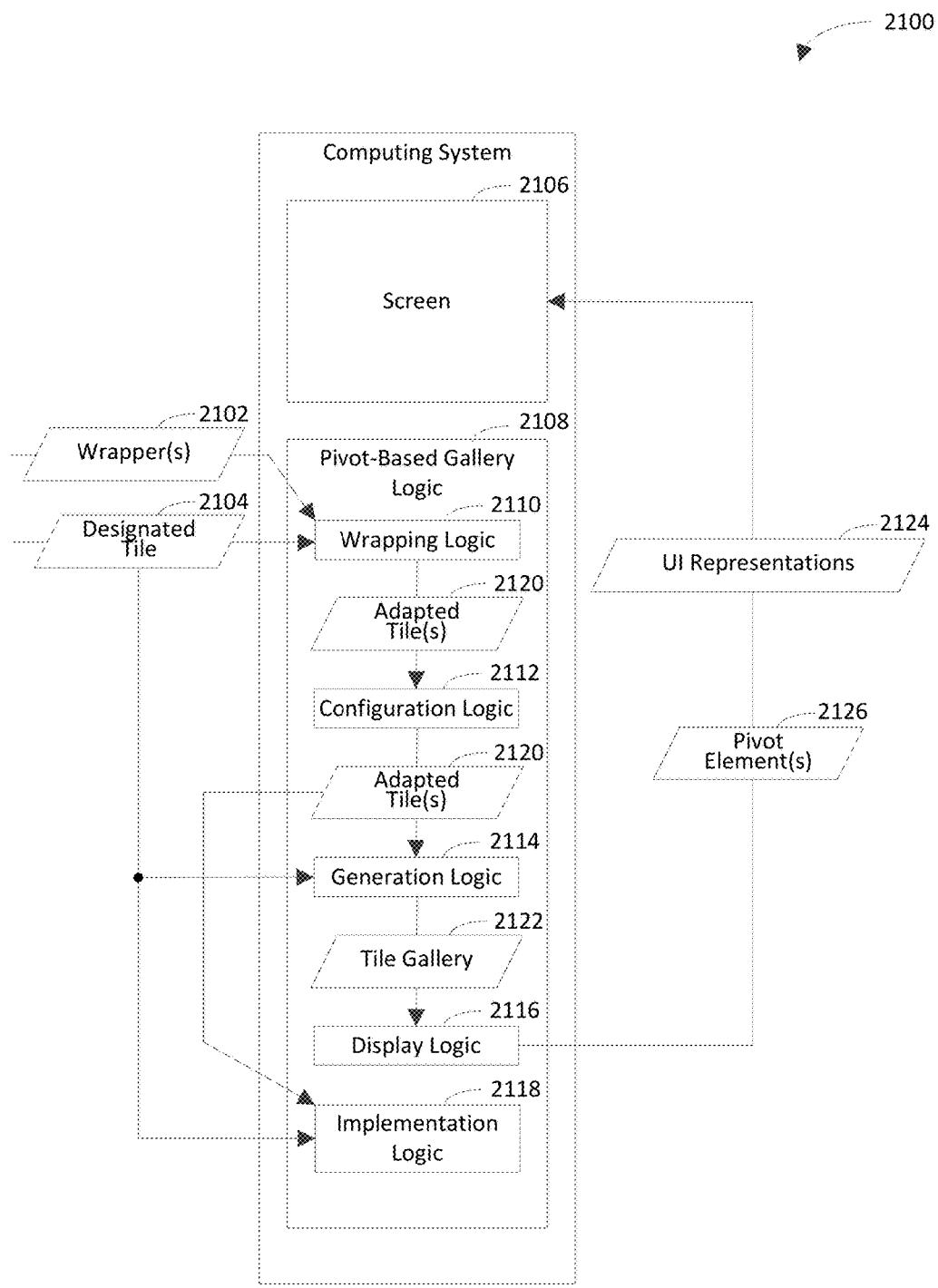
FIG. 21 is a block diagram of an example computing system in accordance with an embodiment.

FIGS. 19-20 depict flowcharts 1900 and 2000 of example methods for providing a pivot-based tile gallery with an adapted tile in accordance with embodiments. Flowcharts 1900 and 2000 may be performed by any one or more of client devices 102A-102M and/or any one or more of machines 106A-106N shown in FIG. 1, for example. For illustrative purposes, flowcharts 1900 and 2000 are described with respect to a computing system 2100 shown in FIG. 21. For instance, computing system 2100 may be an example implementation of a client device shown in FIG. 1. As shown in FIG. 21, computing system 2100 includes a screen 2106 and pivot-based gallery logic 2108. Pivot-based gallery logic 2108 includes wrapping logic 2110, configuration logic 2112, generation logic 2114, display logic 2116, and implementation logic 2118. Further structural and operational embodiments will be apparent to persons skilled in the relevant art(s) based on the discussion regarding flowchart 2000.

As shown in FIG. 19, the method of flowchart 1900 begins at step 1902. In step 1902, a designated tile is wrapped in a wrapper to provide an adapted tile. The designated tile is configured to implement functionality of a designated aspect of a designated resource that is accessible via (e.g., by) an application based on (e.g., based at least in part on) first input(s). For instance, each of the first input(s) may correspond to a respective first property of the designated tile. The designated tile has a first code interface that is configured to receive the first input(s). The designated tile may include metadata that includes a uniform resource identifier that identifies a location of the designated resource, though the scope of the example embodiments is not limited in this respect. In an example implementation, wrapping logic 2110 wraps a designated tile 2104 in the wrapper, which is included in wrapper(s) 2102, to provide an adapted tile, which is included in adapted tile(s) 2120.

At step 1904, the wrapper is configured to utilize the designated tile to implement the functionality of the designated aspect of the designated resource based on second input(s). For instance, each of the second input(s) may correspond to a respective second property of the adapted tile. At least one of the second input(s) is different from at least one of the first input(s). The wrapper has a second code interface that is configured to receive the second input(s). In an example implementation, configuration logic 2112 configures the wrapper to utilize the designated tile 2104 to implement the functionality of the designated aspect of the designated resource based on the second input(s). For instance, configuration logic 2112 may insert metadata and/or code in the wrapper, which is included in the adapted tile, to utilize the designated tile 2104. In one example, the designated aspect of the resource is a chart associated with the resource. The designated tile may be configured to create an instance of the chart that shows first information regarding the resource. The wrapper may be configured to create an instance of the chart that shows second information regarding the resource. For instance, the first information may indicate a number of errors that occur with regard to the resource, and the second information may indicate a percentage of central processing unit (CPU) resources that are consumed by the resource.

In an example embodiment, configuring the wrapper at step 1904 includes configuring the wrapper to infer at least one of the first input(s) from at least one of the second input(s). For instance, code that is included in the wrapper may be executed to infer at least one of the first input(s). For example, implementation logic 2118 may execute the code.

In another example embodiment, configuring the wrapper at step 1904 includes configuring the wrapper to set at least one of the first input(s) to at least one respective default value. For instance, the default value may be a character string (e.g., a number or a word).

In yet another example embodiment, the first input(s) include a designated first input. In accordance with this embodiment, the second input(s) include a designated second input. In further accordance with this embodiment, configuring the wrapper at step 1904 includes configuring the wrapper to bind the designated second input to the designated first input. In an aspect of this embodiment, the second input(s) include a single input, which is the designated second input. In accordance with this aspect, the first input(s) include multiple inputs. In another aspect of this embodiment, configuring the wrapper at step 1904 includes configuring the wrapper to provide the designated second input unmodified to the designated tile to serve as the designated first input. In yet another aspect of this embodiment, configuring the wrapper at step 1904 includes configuring the wrapper to translate the designated second input from a first form to a second form and to provide the second form to the designated tile to serve as the designated first input. For instance, code that is included in the wrapper may be executed to translate the designated second input. For example, implementation logic 2118 may execute the code.

In still another example embodiment, the second input(s) include an identifier that specifies the application. In accordance with this embodiment, configuring the wrapper at step 1904 includes configuring the wrapper to generate a query that specifies the first input(s) based on the identifier. In further accordance with this embodiment, the designated tile is configured to execute the query to enable the adapted tile to provide the functionality of the designated aspect of the designated resource.

At step 1906, a tile gallery is generated that includes tiles that are configured to provide user interface (UI) representations of aspects of resources that are accessible via the application. For example, each of the UI representations may be selectable to cause functionality associated with the respective UI representation to be implemented. In another example, each of the UI representations may indicate (e.g., describe) the functionality, provide access to the functionality, etc. In an example implementation, generation logic 2114 generates a tile gallery 2122 to include the tiles that are configured to provide the UI representations, which are included among UI representations 2124.

The method of flowchart 1900 may include displaying a UI representation of the tile gallery. For instance, display logic 2116 may display the UI representation of the tile gallery, which is included among UI representations 2124, on screen 2106. Displaying the UI representation of the tile gallery may include steps 1908 and 1910.

At step 1908, a first pivot element is displayed that enables selection of a subset from subsets of the tiles. Each subset includes at least one of the tiles. For example, any one or more of the subsets may include two or more of the tiles, three or more of the tiles, etc. In an example implementation, display logic 2116 displays the first pivot element, which is included among pivot element(s) 2126.

In an example embodiment, displaying the first pivot element at step 1908 includes displaying the first pivot element that enables selection of a selected resource from the resources. In accordance with this embodiment, the selected resource corresponds to the selected subset.

At step 1910, first UI representations of the aspects that are provided by the tiles in a selected subset, which is selected via the first pivot element, are displayed. For instance, second UI representations of the aspects that are provided by the tiles that are not included in the selected subset may not be displayed. The first UI representations are selectable to cause functionality of the aspects that are associated with the respective tiles to be implemented. The first UI representations include a designated UI representation that corresponds to the adapted tile and that is selectable to cause the functionality of the designated aspect to be implemented. In an example implementation, display logic 2116 displays the first UI representations.

In an example embodiment, displaying the first UI representations at step 1910 includes displaying the first UI representations of the aspects that are provided by the tiles in the selected subset and not the UI representations of the aspects that are provided by the tiles in others of the subsets.

In another example, embodiment, wrapping the designated tile at step 1902 includes wrapping the designated tile in a plurality of wrappers to provide a plurality of respective adapted tiles. In accordance with this embodiment, configuring the wrapper at step 1904 includes configuring each wrapper of the plurality of wrappers to utilize the designated tile to implement the functionality of the designated aspect of the designated resource based on respective second input(s). In accordance with this embodiment, at least one of the respective second input(s) is different from at least one of the first input(s). In further accordance with this embodiment, each wrapper of the plurality of wrappers has a respective second code interface that is configured to receive the respective second input(s).

In some example embodiments, one or more steps 1902, 1904, 1906, 1908, and/or 1910 of flowchart 1900 may not be performed. Moreover, steps in addition to or in lieu of steps 1902, 1904, 1906, 1908, and/or 1910 may be performed. For instance, in some example embodiments, displaying the UI representation of the tile gallery may include steps in addition to steps 1908 and 1910. For instance, in an example embodiment, displaying the UI representation of the tile gallery further includes displaying a second pivot element that enables selection of a group from multiple groups of the tiles. In accordance with this embodiment, each group includes respective subsets of the tiles. In further accordance with this embodiment, displaying the first pivot element at step 1908 includes displaying the first pivot element that enables selection of a subset from the subsets in a selected group, which is selected via the second pivot element. For instance, display logic 2116 may display the second pivot element, which is included among pivot element(s) 2116.

In another example embodiment, displaying the UI representation of the tile gallery further includes displaying a second pivot element that enables selection of a selected resource group from multiple resource groups. Each resource group includes a respective subset of the resources. In accordance with this embodiment, displaying the first pivot element at step 1908 includes displaying the first pivot element that enables selection of a selected resource from the subset of the resources in the selected resource group. In further accordance with this embodiment, the selected resource corresponds to the selected subset.

As shown in FIG. 20, the method of flowchart 2000 begins at step 2002. In step 2002, a tile gallery is generated that includes tiles that are configured to provide user interface (UI) representations of aspects of resources that are accessible via (e.g., by) an application. In an example implementation, generation logic 2114 generates the tile gallery 2122 to include the tiles.

The method of flowchart 2000 may include displaying a UI representation of the tile gallery. For instance, displaying the UI representation of the tile gallery may include steps 2004 and 2006.

At step 2004, a first pivot element is displayed that enables selection of a subset from subsets of the tiles. Each subset includes at least one of the tiles. In an example implementation, display logic 2116 displays the first pivot element.

In an example embodiment, displaying the first pivot element at step 2004 includes displaying the first pivot element that enables selection of a selected resource from the resources. In accordance with this embodiment, the selected resource corresponds to the selected subset.

At step 2006, first UI representations of the aspects that are provided by the tiles in a selected subset, which is selected via the first pivot element, are displayed. For instance, second UI representations of the aspects that are provided by the tiles that are not included in the selected subset may not be displayed. The first UI representations are selectable to cause functionality of the aspects that are associated with the respective tiles to be implemented. The selected subset includes a designated tile and an adapted tile. The adapted tile includes the designated tile and a wrapper that wraps the designated tile. For instance displaying the first UI representations may include displaying a first designated UI representation of a designated aspect of a designated resource that is provided by the designated tile. Displaying the first UI representations may further include displaying a second designated UI representation of the designated aspect of the designated resource that is provided by the adapted tile. In an example implementation, display logic 2116 displays the first UI representations.

In an example embodiment, displaying the first UI representations at step 2006 includes displaying the first UI representations of the aspects that are provided by the tiles in the selected subset and not the UI representations of the aspects that are provided by the tiles in others of the subsets.

In some example embodiments, one or more steps 2002, 2004, and/or 2006 of flowchart 2000 may not be performed. Moreover, steps in addition to or in lieu of steps 2002, 2004, and/or 2006 may be performed. For instance, in some example embodiments, displaying the UI representation of the tile gallery may include steps in addition to steps 2004 and 2006. For instance, in an example embodiment, displaying the UI representation of the tile gallery further includes displaying a second pivot element that enables selection of a group from multiple groups of the tiles. In accordance with this embodiment, each group includes respective subsets of the tiles. In further accordance with this embodiment, displaying the first pivot element at step 2004 includes displaying the first pivot element that enables selection of a subset from the subsets in a selected group, which is selected via the second pivot element.

In another example embodiment, displaying the UI representation of the tile gallery further includes displaying a second pivot element that enables selection of a selected resource group from multiple resource groups. In accordance with this embodiment, each resource group includes a respective subset of the resources. In further accordance with this embodiment, displaying the first pivot element at step 2004 includes displaying the first pivot element that enables selection of a selected resource from the subset of the resources in the selected resource group. In further accordance with this embodiment, the selected resource corresponds to the selected subset.

In yet another example embodiment, the method of flowchart 2000 further includes executing code that is included in the designated tile to implement the functionality of the designated aspect of the designated resource in response to (e.g., based on) selection of the first designated UI representation or the second designated UI representation. In accordance with this embodiment, the designated tile is configured to indicate a first manner in which the functionality is to be implemented based on (e.g., based at least in part on) selection of the first designated UI representation. In further accordance with this embodiment, the adapted tile is configured to indicate a second manner in which the functionality is to be implemented based on selection of the second designated UI representation. In further accordance with this embodiment, the second manner is different from the first manner. For instance, implementation logic 2118 may execute the code.

In still another example embodiment, the method of flowchart 2000 further includes wrapping the designated tile in the wrapper to provide the adapted tile. In accordance with this embodiment, the designated tile is configured to implement functionality of the designated aspect of the designated resource based on first input(s). In further accordance with this embodiment, the designated tile has a first code interface that is configured to receive the first input(s). In further accordance with this embodiment, the method of flowchart 2000 further includes configuring the wrapper to utilize the designated tile to implement the functionality of the designated aspect of the designated resource based on second input(s). In further accordance with this embodiment, at least one of the second input(s) is different from at least one of the first input(s). In further accordance with this embodiment, the wrapper has a second code interface that is configured to receive the second input(s).

In an aspect of this embodiment, the first input(s) include a designated first input. In accordance with this aspect, the second input(s) include a designated second input. In further accordance with this aspect, configuring the wrapper includes configuring the wrapper to bind the designated second input to the designated first input. In an example of this aspect, the second input(s) include a single input, which is the designated second input. In accordance with this example, the first input(s) include multiple inputs. In another example of this aspect, configuring the wrapper includes configuring the wrapper to provide the designated second input unmodified to the designated tile to serve as the designated first input. In yet another example of this aspect, configuring the wrapper includes configuring the wrapper to translate the designated second input from a first form to a second form and to provide the second form to the designated tile to serve as the designated first input.

In another aspect of this embodiment, configuring the wrapper includes configuring the wrapper to infer at least one of the first input(s) from at least one of the second input(s).

In yet another aspect of this embodiment, configuring the wrapper includes configuring the wrapper to set at least one of the first input(s) to at least one respective default value.

In still another aspect of this embodiment, the second input(s) include an identifier that specifies the application. In accordance with this aspect, configuring the wrapper includes configuring the wrapper to generate a query that specifies the first input(s) based on the identifier. In further accordance with this aspect, the designated tile is configured to execute the query to enable the adapted tile to provide the functionality of the designated aspect of the designated resource.

In yet another aspect of this embodiment, wrapping the designated tile includes wrapping the designated tile in a plurality of wrappers to provide a plurality of respective adapted tiles. In accordance with this aspect, configuring the wrapper includes configuring each wrapper of the plurality of wrappers to utilize the designated tile to implement the functionality of the designated aspect of the designated resource based on respective second input(s). In further accordance with this aspect, at least one of the respective second input(s) is different from at least one of the first input(s). In further accordance with this aspect, each wrapper of the plurality of wrappers has a respective second code interface that is configured to receive the respective second input(s).

In an example of this aspect, displaying the first UI representations at step 2006 includes displaying a first designated UI representation and a plurality of second designated UI representations of the designated resource that are provided by the plurality of respective adapted tiles simultaneously in the UI representation of the tile gallery on a screen. For instance, display logic 2116 may display the first designated UI representation and the plurality of second designated UI representations simultaneously on screen 2106.

In an implementation of this example, the method of flowchart 2000 further includes executing code that is included in the designated tile to implement the functionality of the designated aspect of the designated resource in response to selection of the first designated UI representation or a second designated UI representation of the plurality of second designated UI representations. In accordance with this implementation, the designated tile is configured to indicate a first manner in which the functionality is to be implemented based on selection of the first designated UI representation. In further accordance with this implementation, each of the plurality of adapted tiles is configured to indicate a respective second manner in which the functionality is to be implemented based on selection of the respective second designated UI representation. In further accordance with this implementation, each second manner is different from each other second manner and is different from the first manner.

Wrapping logic 2110, configuration logic 2112, generation logic 2114, display logic 2116, and/or implementation logic 2118 may be implemented as (or incorporated into) a shell. A shell is a user interface that is configured to access services of an operating system. For instance, the shell may use a command-line interface (CLI) or a graphical user interface (GUI) to provide access to the services of the operating system to a user of computing system 2100.

It will be recognized that computing system 2100 may not include one or more of screen 2106, wrapping logic 2110, configuration logic 2112, generation logic 2114, display logic 2116, and/or implementation logic 2118. Furthermore, computing system 2100 may include components in addition to or in lieu of screen 2106, wrapping logic 2110, configuration logic 2112, generation logic 2114, display logic 2116, and/or implementation logic 2118.

Any one or more of client devices 102A-102M, any one or more of machines 106A-106N, pivot-based gallery logic 108, pivot-based gallery logic 2108, wrapping logic 2110, configuration logic 2112, generation logic 2114, display logic 2116, implementation logic 2118, flowchart 1900, and/or flowchart 2000 may be implemented in hardware, software, firmware, or any combination thereof.

For example, any one or more of client devices 102A-102M, any one or more of machines 106A-106N, pivot-based gallery logic 108, pivot-based gallery logic 2108, wrapping logic 2110, configuration logic 2112, generation logic 2114, display logic 2116, implementation logic 2118, flowchart 1900, and/or flowchart 2000 may be implemented, at least in part, as computer program code configured to be executed in one or more processors.

In another example, any one or more of client devices 102A-102M, any one or more of machines 106A-106N, pivot-based gallery logic 108, pivot-based gallery logic 2108, wrapping logic 2110, configuration logic 2112, generation logic 2114, display logic 2116, implementation logic 2118, flowchart 1900, and/or flowchart 2000 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

In a first example method providing a pivot-based tile gallery with an adapted tile using one or more processors of a processor-based system, a designated tile is wrapped in a wrapper, using at least one of the one or more processors, to provide an adapted tile. The designated tile is configured, using at least one of the one or more processors, to implement functionality of a designated aspect of a designated resource that is accessible via an application based on one or more first inputs. The designated tile has a first code interface that is configured to receive the one or more first inputs. The wrapper is configured to utilize the designated tile to implement the functionality of the designated aspect of the designated resource based on one or more second inputs. At least one of the one or more second inputs is different from at least one of the one or more first inputs. The wrapper has a second code interface that is configured to receive the one or more second inputs. A tile gallery that includes tiles that are configured to provide user interface (UI) representations of aspects of resources that are accessible via the application is generated using at least one of the one or more processors. A UI representation of the tile gallery is displayed using at least one of the one or more processors. Displaying the UI representation of the tile gallery comprises displaying a first pivot element that enables selection of a subset from subsets of the tiles. Each subset includes at least one of the tiles. Displaying the UI representation of the tile gallery further comprises displaying first UI representations of the aspects that are provided by the tiles in a selected subset, which is selected via the first pivot element, and not second UI representations of the aspects that are provided by the tiles that are not included in the selected subset. The first UI representations are selectable to cause functionality of the aspects that are associated with the respective tiles to be implemented. The first UI representations include a designated UI representation that corresponds to the adapted tile and that is selectable to cause the functionality of the designated aspect to be implemented.

In a first aspect of the first example method, displaying the first UI representations comprises displaying the first UI representations of the aspects that are provided by the tiles in the selected subset and not the UI representations of the aspects that are provided by the tiles in others of the subsets.

In a second aspect of the first example method, displaying the UI representation of the tile gallery further comprises displaying a second pivot element that enables selection of a group from multiple groups of the tiles. Each group including respective subsets of the tiles. In accordance with the second aspect, displaying the first pivot element comprises displaying the first pivot element that enables selection of a subset from the subsets in a selected group, which is selected via the second pivot element. The second aspect of the first example method may be implemented in combination with the first aspect of the first example method, though the example embodiments are not limited in this respect.

In a third aspect of the first example method, displaying the first pivot element comprises displaying the first pivot element that enables selection of a selected resource from the resources. The selected resource corresponds to the selected subset. The third aspect of the first example method may be implemented in combination with the first and/or second aspect of the first example method, though the example embodiments are not limited in this respect.

In a fourth aspect of the first example method, displaying the UI representation of the tile gallery further comprises displaying a second pivot element that enables selection of a selected resource group from multiple resource groups. Each resource group includes a respective subset of the resources. In accordance with the fourth aspect, displaying the first pivot element comprises displaying the first pivot element that enables selection of a selected resource from the subset of the resources in the selected resource group. The selected resource corresponds to the selected subset. The fourth aspect of the first example method may be implemented in combination with the first, second, and/or third aspect of the first example method, though the example embodiments are not limited in this respect.

In a fifth aspect of the first example method, the one or more first inputs include a designated first input. In accordance with the fifth aspect, the one or more second inputs include a designated second input. In further accordance with the fifth aspect, configuring the wrapper comprises configuring the wrapper to bind the designated second input to the designated first input. The fifth aspect of the first example method may be implemented in combination with the first, second, third, and/or fourth aspect of the first example method, though the example embodiments are not limited in this respect.

In an example of the fifth aspect of the first example method, the one or more second inputs include a single input. The single input is the designated second input. In accordance with this example of the fifth aspect, the one or more first inputs include multiple inputs.

In another example of the fifth aspect of the first example method, configuring the wrapper comprises configuring the wrapper to provide the designated second input unmodified to the designated tile to serve as the designated first input.

In yet another example of the fifth aspect of the first example method, configuring the wrapper comprises configuring the wrapper to translate the designated second input from a first form to a second form and to provide the second form to the designated tile to serve as the designated first input.

In a sixth aspect of the first example method, configuring the wrapper comprises configuring the wrapper to infer at least one of the one or more first inputs from at least one of the one or more second inputs. The sixth aspect of the first example method may be implemented in combination with the first, second, third, fourth, and/or fifth aspect of the first example method, though the example embodiments are not limited in this respect.

In a seventh aspect of the first example method, configuring the wrapper comprises configuring the wrapper to set at least one of the one or more first inputs to at least one respective default value. The seventh aspect of the first example method may be implemented in combination with the first, second, third, fourth, fifth, and/or sixth aspect of the first example method, though the example embodiments are not limited in this respect.

In an eighth aspect of the first example method, the one or more second inputs include an identifier that specifies the application. In accordance with the eighth aspect, configuring the wrapper comprises configuring the wrapper to generate a query that specifies the one or more first inputs based on the identifier. In further accordance with the eighth aspect, the designated tile is configured to execute the query to enable the adapted tile to provide the functionality of the designated aspect of the designated resource. The eighth aspect of the first example method may be implemented in combination with the first, second, third, fourth, fifth, sixth, and/or seventh aspect of the first example method, though the example embodiments are not limited in this respect.

In a ninth aspect of the first example method, wrapping the designated tile comprises wrapping the designated tile in a plurality of wrappers to provide a plurality of respective adapted tiles. In accordance with the ninth aspect, configuring the wrapper comprises configuring each wrapper of the plurality of wrappers to utilize the designated tile to implement the functionality of the designated aspect of the designated resource based on one or more respective second inputs. At least one of the one or more respective second inputs is different from at least one of the one or more first inputs. Each wrapper of the plurality of wrappers has a respective second code interface that is configured to receive the one or more respective second inputs. The ninth aspect of the first example method may be implemented in combination with the first, second, third, fourth, fifth, sixth, seventh, and/or eighth aspect of the first example method, though the example embodiments are not limited in this respect.

In a second example method of providing a pivot-based tile gallery with an adapted tile using one or more processors of a processor-based system, a tile gallery that includes tiles that are configured to provide user interface (UI) representations of aspects of resources that are accessible via an application is generated using at least one of the one or more processors. A UI representation of the tile gallery is displayed using at least one of the one or more processors. Displaying the UI representation of the tile gallery comprises displaying a first pivot element that enables selection of a subset from subsets of the tiles. Each subset includes at least one of the tiles. Displaying the UI representation of the tile gallery further comprises displaying first UI representations of the aspects that are provided by the tiles in a selected subset, which is selected via the first pivot element, and not second UI representations of the aspects that are provided by the tiles that are not included in the selected subset. The first UI representations are selectable to cause functionality of the aspects that are associated with the respective tiles to be implemented. Displaying the first UI representations comprises displaying a first designated UI representation of a designated aspect of a designated resource that is provided by a designated tile in the selected subset. Displaying the first UI representations further comprises displaying a second designated UI representation of the designated aspect of the designated resource that is provided by an adapted tile in the selected subset. The adapted tile includes the designated tile and a wrapper that wraps the designated tile.

In a first aspect of the second example method, displaying the first UI representations comprises displaying the first UI representations of the aspects that are provided by the tiles in the selected subset and not the UI representations of the aspects that are provided by the tiles in others of the subsets.

In a second aspect of the second example method, displaying the UI representation of the tile gallery further comprises displaying a second pivot element that enables selection of a group from multiple groups of the tiles. Each group includes respective subsets of the tiles. In accordance with the second aspect, displaying the first pivot element comprises displaying the first pivot element that enables selection of a subset from the subsets in a selected group, which is selected via the second pivot element. The second aspect of the second example method may be implemented in combination with the first aspect of the second example method, though the example embodiments are not limited in this respect.

In a third aspect of the second example method, displaying the first pivot element comprises displaying the first pivot element that enables selection of a selected resource from the resources. The selected resource corresponds to the selected subset. The third aspect of the second example method may be implemented in combination with the first and/or second aspect of the second example method, though the example embodiments are not limited in this respect.

In a fourth aspect of the second example method, displaying the UI representation of the tile gallery further comprises displaying a second pivot element that enables selection of a selected resource group from multiple resource groups. Each resource group includes a respective subset of the resources. In accordance with the fourth aspect, displaying the first pivot element comprises displaying the first pivot element that enables selection of a selected resource from the subset of the resources in the selected resource group. The selected resource corresponds to the selected subset. The fourth aspect of the second example method may be implemented in combination with the first, second, and/or third aspect of the second example method, though the example embodiments are not limited in this respect.

In a fifth aspect of the second example method, the second example method further comprises wrapping the designated tile in the wrapper to provide the adapted tile. The designated tile is configured to implement functionality of the designated aspect of the designated resource based on one or more first inputs, the designated tile having a first code interface that is configured to receive the one or more first inputs. In accordance with the fifth aspect, the second example method further comprises configuring the wrapper to utilize the designated tile to implement the functionality of the designated aspect of the designated resource based on one or more second inputs. At least one of the one or more second inputs is different from at least one of the one or more first inputs. The wrapper has a second code interface that is configured to receive the one or more second inputs. The fifth aspect of the second example method may be implemented in combination with the first, second, third, and/or fourth aspect of the second example method, though the example embodiments are not limited in this respect.

In an example of the fifth aspect of the second example method, the one or more first inputs include a designated first input. In accordance with this example, the one or more second inputs include a designated second input. In further accordance with this example, configuring the wrapper comprises configuring the wrapper to bind the designated second input to the designated first input.

In an implementation of this example of the fifth aspect of the second example method, the one or more second inputs include a single input. The single input is the designated second input. In accordance with this implementation, the one or more first inputs include multiple inputs.

In another implementation of this example of the fifth aspect of the second example method, configuring the wrapper comprises configuring the wrapper to provide the designated second input unmodified to the designated tile to serve as the designated first input.

In yet another implementation of this example of the fifth aspect of the second example method, configuring the wrapper comprises configuring the wrapper to translate the designated second input from a first form to a second form and to provide the second form to the designated tile to serve as the designated first input.

In another example of the fifth aspect of the second example method, configuring the wrapper comprises configuring the wrapper to infer at least one of the one or more first inputs from at least one of the one or more second inputs.

In yet another example of the fifth aspect of the second example method, configuring the wrapper comprises configuring the wrapper to set at least one of the one or more first inputs to at least one respective default value.

In still another example of the fifth aspect of the second example method, the one or more second inputs include an identifier that specifies the application. In accordance with this example, configuring the wrapper comprises configuring the wrapper to generate a query that specifies the one or more first inputs based on the identifier. In further accordance with this example, the designated tile is configured to execute the query to enable the adapted tile to provide the functionality of the designated aspect of the designated resource.

In yet another example of the fifth aspect of the second example method, wrapping the designated tile comprises wrapping the designated tile in a plurality of wrappers to provide a plurality of respective adapted tiles. In accordance with this example, configuring the wrapper comprises configuring each wrapper of the plurality of wrappers to utilize the designated tile to implement the functionality of the designated aspect of the designated resource based on one or more respective second inputs, at least one of the one or more respective second inputs being different from at least one of the one or more first inputs. Each wrapper of the plurality of wrappers has a respective second code interface that is configured to receive the one or more respective second inputs.

In an implementation of this example of the fifth aspect of the second example method, displaying the first UI representations comprises displaying a first designated UI representation and a plurality of second designated UI representations of the designated resource that are provided by the plurality of respective adapted tiles simultaneously in the UI representation of the tile gallery on a screen of the processor-based system.

In an example of this implementation, the second example method further comprises executing code that is included in the designated tile to implement the functionality of the designated aspect of the designated resource in response to selection of the first designated UI representation or a second designated UI representation of the plurality of second designated UI representations The designated tile is configured to indicate a first manner in which the functionality is to be implemented based on selection of the first designated UI representation. Each of the plurality of adapted tiles is configured to indicate a respective second manner in which the functionality is to be implemented based on selection of the respective second designated UI representation. Each second manner is different from each other second manner and is different from the first manner.

In a sixth aspect of the second example method, the second example method further comprises executing code that is included in the designated tile to implement the functionality of the designated aspect of the designated resource in response to selection of the first designated UI representation or the second designated UI representation. The designated tile is configured to indicate a first manner in which the functionality is to be implemented based on selection of the first designated UI representation. The adapted tile is configured to indicate a second manner in which the functionality is to be implemented based on selection of the second designated UI representation. The second manner is different from the first manner.

A first example system to provide a pivot-based tile gallery with an adapted tile comprises an element comprising at least one of (a) a processor, (b) hardware logic, or (c) electrical circuitry. The first example system further comprises wrapping logic, implemented using the element, configured to wrap a designated tile in a wrapper to provide an adapted tile. The designated tile is configured to implement functionality of a designated aspect of a designated resource based on one or more first inputs. The designated tile has a first code interface that is configured to receive the one or more first inputs. The first example system further comprises configuration logic, implemented using the element, configured to configure the wrapper to utilize the designated tile to implement the functionality of the designated aspect of the designated resource based on one or more second inputs. At least one of the one or more second inputs is different from at least one of the one or more first inputs. The wrapper has a second code interface that is configured to receive the one or more second inputs. The first example system further comprises generation logic, implemented using the element, configured to generate a tile gallery that includes tiles that are configured to provide user interface (UI) representations of aspects of resources that are accessible via an application. The first example system further comprises display logic, implemented using the element, configured to display a UI representation of the tile gallery that comprises a first pivot element that enables selection of a subset from subsets of the tiles and that further comprises first UI representations of the aspects that are provided by the tiles in a selected subset, which is selected via the first pivot element, and not second UI representations of the aspects that are provided by the tiles that are not included in the selected subset. Each subset includes at least one of the tiles. The first UI representations is selectable to cause functionality of the aspects that are associated with the respective tiles to be implemented. The first UI representations include a designated UI representation that corresponds to the adapted tile and that is selectable to cause the functionality of the designated aspect to be implemented.

In a first aspect of the first example system, the display logic is configured to display the UI representation of the tile gallery that comprises the first UI representations of the aspects that are provided by the tiles in the selected subset and not the UI representations of the aspects that are provided by the tiles in others of the subsets.

In a second aspect of the first example system, the display logic is configured to display the UI representation of the tile gallery that further comprises a second pivot element that enables selection of a group from multiple groups of the tiles. Each group includes respective subsets of the tiles. In accordance with the second aspect, the first pivot element enables selection of a subset from the subsets in a selected group, which is selected via the second pivot element. The second aspect of the first example system may be implemented in combination with the first aspect of the first example system, though the example embodiments are not limited in this respect.

In a third aspect of the first example system, the first pivot element enables selection of a selected resource from the resources, the selected resource corresponding to the selected subset. The third aspect of the first example system may be implemented in combination with the first and/or second aspect of the first example system, though the example embodiments are not limited in this respect.

In a fourth aspect of the first example system, the display logic is configured to display the UI representation of the tile gallery that further comprises a second pivot element that enables selection of a selected resource group from multiple resource groups. Each resource group includes a respective subset of the resources. In accordance with the fourth aspect, the first pivot element enables selection of a selected resource from the subset of the resources in the selected resource group. The selected resource corresponds to the selected subset. The fourth aspect of the first example system may be implemented in combination with the first, second, and/or third aspect of the first example system, though the example embodiments are not limited in this respect.

In a fifth aspect of the first example system, the one or more first inputs include a designated first input. In accordance with the fifth aspect, the one or more second inputs include a designated second input. In further accordance with the fifth aspect, the configuration logic is configured to configure the wrapper to bind the designated second input to the designated first input. The fifth aspect of the first example system may be implemented in combination with the first, second, third, and/or fourth aspect of the first example system, though the example embodiments are not limited in this respect.

In an example of the fifth aspect of the first example system, the one or more second inputs include a single input. The single input is the designated second input. In accordance with this example, the one or more first inputs include multiple inputs.

In another example of the fifth aspect of the first example system, the configuration logic is configured to configure the wrapper to provide the designated second input unmodified to the designated tile to serve as the designated first input.

In yet another example of the fifth aspect of the first example system, the configuration logic is configured to configure the wrapper to translate the designated second input from a first form to a second form and to provide the second form to the designated tile to serve as the designated first input.

In a sixth aspect of the first example system, the configuration logic is configured to configure the wrapper to infer at least one of the one or more first inputs from at least one of the one or more second inputs. The sixth aspect of the first example system may be implemented in combination with the first, second, third, fourth, and/or fifth aspect of the first example system, though the example embodiments are not limited in this respect.

In a seventh aspect of the first example system, the configuration logic is configured to configure the wrapper to set at least one of the one or more first inputs to at least one respective default value. The seventh aspect of the first example system may be implemented in combination with the first, second, third, fourth, fifth, and/or sixth aspect of the first example system, though the example embodiments are not limited in this respect.

In an eighth aspect of the first example system, the one or more second inputs include an identifier that specifies the application. In accordance with the eighth aspect, the configuration logic is configured to configure the wrapper to generate a query that specifies the one or more first inputs based on the identifier. In further accordance with the eighth aspect, the designated tile is configured to execute the query to enable the adapted tile to provide the functionality of the designated aspect of the designated resource. The eighth aspect of the first example system may be implemented in combination with the first, second, third, fourth, fifth, sixth, and/or seventh aspect of the first example system, though the example embodiments are not limited in this respect.

In a ninth aspect of the first example system, the wrapping logic is configured to wrap the designated tile in a plurality of wrappers to provide a plurality of respective adapted tiles. In accordance with the ninth aspect, the configuration logic is configured to configure each wrapper of the plurality of wrappers to utilize the designated tile to implement the functionality of the designated aspect of the designated resource based on one or more respective second inputs. In further accordance with the ninth aspect, at least one of the one or more respective second inputs is different from at least one of the one or more first inputs. In further accordance with the ninth aspect, each wrapper of the plurality of wrappers has a respective second code interface that is configured to receive the one or more respective second inputs. The ninth aspect of the first example system may be implemented in combination with the first, second, third, fourth, fifth, sixth, seventh, and/or eighth aspect of the first example system, though the example embodiments are not limited in this respect.

A second example system to provide a pivot-based tile gallery with an adapted tile comprises an element comprising at least one of (a) a processor, (b) hardware logic, or (c) electrical circuitry. The second example system further comprises generation logic, implemented using the element, configured to generate a tile gallery that includes tiles that are configured to provide user interface (UI) representations of aspects of resources that are accessible via an application. The second example system further comprises display logic, implemented using the element, configured to display a UI representation of the tile gallery. the UI representation of the tile gallery comprises a first pivot element that enables selection of a subset from subsets of the tiles and further comprises first UI representations of the aspects that are provided by the tiles in a selected subset, which is selected via the first pivot element, and not second UI representations of the aspects that are provided by the tiles that are not included in the selected subset. Each subset includes at least one of the tiles. The first UI representations is selectable to cause functionality of the aspects that are associated with the respective tiles to be implemented. The first UI representations comprises a first designated UI representation of a designated aspect of a designated resource that is provided by a designated tile in the selected subset. The first UI representations further comprises a second designated UI representation of the designated aspect of the designated resource that is provided by an adapted tile in the selected subset. The adapted tile includes the designated tile and a wrapper that wraps the designated tile.

In a first aspect of the second example system, the display logic is configured to display the first UI representations of the aspects that are provided by the tiles in the selected subset and not the UI representations of the aspects that are provided by the tiles in others of the subsets.

In a second aspect of the second example system, the UI representation of the tile gallery further comprises a second pivot element that enables selection of a group from multiple groups of the tiles, each group including respective subsets of the tiles. In accordance with the second aspect, the first pivot element enables selection of a subset from the subsets in a selected group, which is selected via the second pivot element. The second aspect of the second example system may be implemented in combination with the first aspect of the second example system, though the example embodiments are not limited in this respect.

In a third aspect of the second example system, the first pivot element enables selection of a selected resource from the resources. The selected resource corresponds to the selected subset. The third aspect of the second example system may be implemented in combination with the first and/or second aspect of the second example system, though the example embodiments are not limited in this respect.

In a fourth aspect of the second example system, the UI representation of the tile gallery further comprises a second pivot element that enables selection of a selected resource group from multiple resource groups, each resource group including a respective subset of the resources. In accordance with the fourth aspect, the first pivot element enables selection of a selected resource from the subset of the resources in the selected resource group. The selected resource corresponds to the selected subset. The fourth aspect of the second example system may be implemented in combination with the first, second, and/or third aspect of the second example system, though the example embodiments are not limited in this respect.

In a fifth aspect of the second example system, the second example system further comprises wrapping logic configured to wrap the designated tile in the wrapper to provide the adapted tile, the designated tile configured to implement functionality of the designated aspect of the designated resource based on one or more first inputs. The designated tile has a first code interface that is configured to receive the one or more first inputs. In accordance with the fifth aspect, the second example system further comprises configuration logic configured to configure the wrapper to utilize the designated tile to implement the functionality of the designated aspect of the designated resource based on one or more second inputs. At least one of the one or more second inputs is different from at least one of the one or more first inputs. The wrapper has a second code interface that is configured to receive the one or more second inputs. The fifth aspect of the second example system may be implemented in combination with the first, second, third, and/or fourth aspect of the second example system, though the example embodiments are not limited in this respect.

In an example of the fifth aspect of the second example system, the one or more first inputs include a designated first input. In accordance with the fifth aspect, the one or more second inputs include a designated second input. In further accordance with the fifth aspect, the configuration logic is configured to configure the wrapper to bind the designated second input to the designated first input.

In an implementation of this example of the fifth aspect of the second example system, the one or more second inputs include a single input. The single input is the designated second input. In accordance with this implementation, the one or more first inputs include multiple inputs.

In another implementation of this example of the fifth aspect of the second example system, the configuration logic is configured to configure the wrapper to provide the designated second input unmodified to the designated tile to serve as the designated first input.

In yet another implementation of this example of the fifth aspect of the second example system, the configuration logic is configured to configure the wrapper to translate the designated second input from a first form to a second form and to provide the second form to the designated tile to serve as the designated first input.

In another example of the fifth aspect of the second example system, the configuration logic is configured to configure the wrapper to infer at least one of the one or more first inputs from at least one of the one or more second inputs.

In yet another example of the fifth aspect of the second example system, the configuration logic is configured to configure the wrapper to set at least one of the one or more first inputs to at least one respective default value.

In still another example of the fifth aspect of the second example system, the one or more second inputs include an identifier that specifies the application. In accordance with this example, the configuration logic is configured to configure the wrapper to generate a query that specifies the one or more first inputs based on the identifier. In further accordance with this example, the designated tile is configured to execute the query to enable the adapted tile to provide the functionality of the designated aspect of the designated resource.

In yet another example of the fifth aspect of the second example system, the wrapping logic is configured to wrap the designated tile in a plurality of wrappers to provide a plurality of respective adapted tiles. In accordance with this example, the configuration logic is configured to configure each wrapper of the plurality of wrappers to utilize the designated tile to implement the functionality of the designated aspect of the designated resource based on one or more respective second inputs. At least one of the one or more respective second inputs is different from at least one of the one or more first inputs. Each wrapper of the plurality of wrappers has a respective second code interface that is configured to receive the one or more respective second inputs.

In an implementation of this example of the fifth aspect of the second example system, the display logic is configured to display a first designated UI representation and a plurality of second designated UI representations of the designated resource that are provided by the plurality of respective adapted tiles simultaneously in the UI representation of the tile gallery on a screen.

In an example of this implementation, the second example system further comprises implementation logic configured to execute code that is included in the designated tile to implement the functionality of the designated aspect of the designated resource in response to selection of the first designated UI representation or a second designated UI representation of the plurality of second designated UI representations The designated tile is configured to indicate a first manner in which the functionality is to be implemented based on selection of the first designated UI representation. Each of the plurality of adapted tiles is configured to indicate a respective second manner in which the functionality is to be implemented based on selection of the respective second designated UI representation. Each second manner is different from each other second manner and is different from the first manner.

In a sixth aspect of the second example system, the second example system further comprises implementation logic configured to execute code that is included in the designated tile to implement the functionality of the designated aspect of the designated resource in response to selection of the first designated UI representation or the second designated UI representation. The designated tile is configured to indicate a first manner in which the functionality is to be implemented based on selection of the first designated UI representation. The adapted tile is configured to indicate a second manner in which the functionality is to be implemented based on selection of the second designated UI representation. The second manner is different from the first manner.

A first example computer program product comprises a computer-readable storage medium having computer program logic recorded thereon for enabling a processor-based system to provide a pivot-based tile gallery with an adapted tile. The computer program logic comprises first program logic for enabling the processor-based system to wrap a designated tile in a wrapper to provide an adapted tile. The designated tile is configured to implement functionality of a designated aspect of a designated resource based on one or more first inputs, the designated tile having a first code interface that is configured to receive the one or more first inputs. The computer program logic further comprises second program logic for enabling the processor-based system to configure the wrapper to utilize the designated tile to implement the functionality of the designated aspect of the designated resource based on one or more second inputs. At least one of the one or more second inputs is different from at least one of the one or more first inputs. The wrapper has a second code interface that is configured to receive the one or more second inputs. The computer program logic further comprises third program logic for enabling the processor-based system to generate a tile gallery that includes tiles that are configured to provide user interface (UI) representations of aspects of resources that are accessible via an application. The computer program logic further comprises fourth program logic for enabling the processor-based system to display a UI representation of the tile gallery. The fourth program logic includes logic for enabling the processor-based system to display a first pivot element that enables selection of a subset from subsets of the tiles, each subset including at least one of the tiles. The fourth program logic includes logic for enabling the processor-based system to display first UI representations of the aspects that are provided by the tiles in a selected subset, which is selected via the first pivot element, and not second UI representations of the aspects that are provided by the tiles that are not included in the selected subset. The first UI representations are selectable to cause functionality of the aspects that are associated with the respective tiles to be implemented. The first UI representations include a designated UI representation that corresponds to the adapted tile and that is selectable to cause the functionality of the designated aspect to be implemented.

A second example computer program product comprises a computer-readable storage medium having computer program logic recorded thereon for enabling a processor-based system to provide a pivot-based tile gallery with an adapted tile. The computer program logic comprises first program logic for enabling the processor-based system to generate a tile gallery that includes tiles that are configured to provide user interface (UI) representations of aspects of resources that are accessible via an application. The computer program logic further comprises second program logic for enabling the processor-based system to display a UI representation of the tile gallery. The second program logic includes logic for enabling the processor-based system to display a first pivot element that enables selection of a subset from subsets of the tiles. Each subset includes at least one of the tiles. The second program logic includes logic for enabling the processor-based system to display first UI representations of the aspects that are provided by the tiles in a selected subset, which is selected via the first pivot element, and not second UI representations of the aspects that are provided by the tiles that are not included in the selected subset. The first UI representations are selectable to cause functionality of the aspects that are associated with the respective tiles to be implemented. The first UI representations comprise a first designated UI representation of a designated aspect of a designated resource that is provided by a designated tile in the selected subset. The first UI representations further comprise a second designated UI representation of the designated aspect of the designated resource that is provided by an adapted tile in the selected subset. The adapted tile includes the designated tile and a wrapper that wraps the designated tile.

IV. Example Computer System

Figure 22:
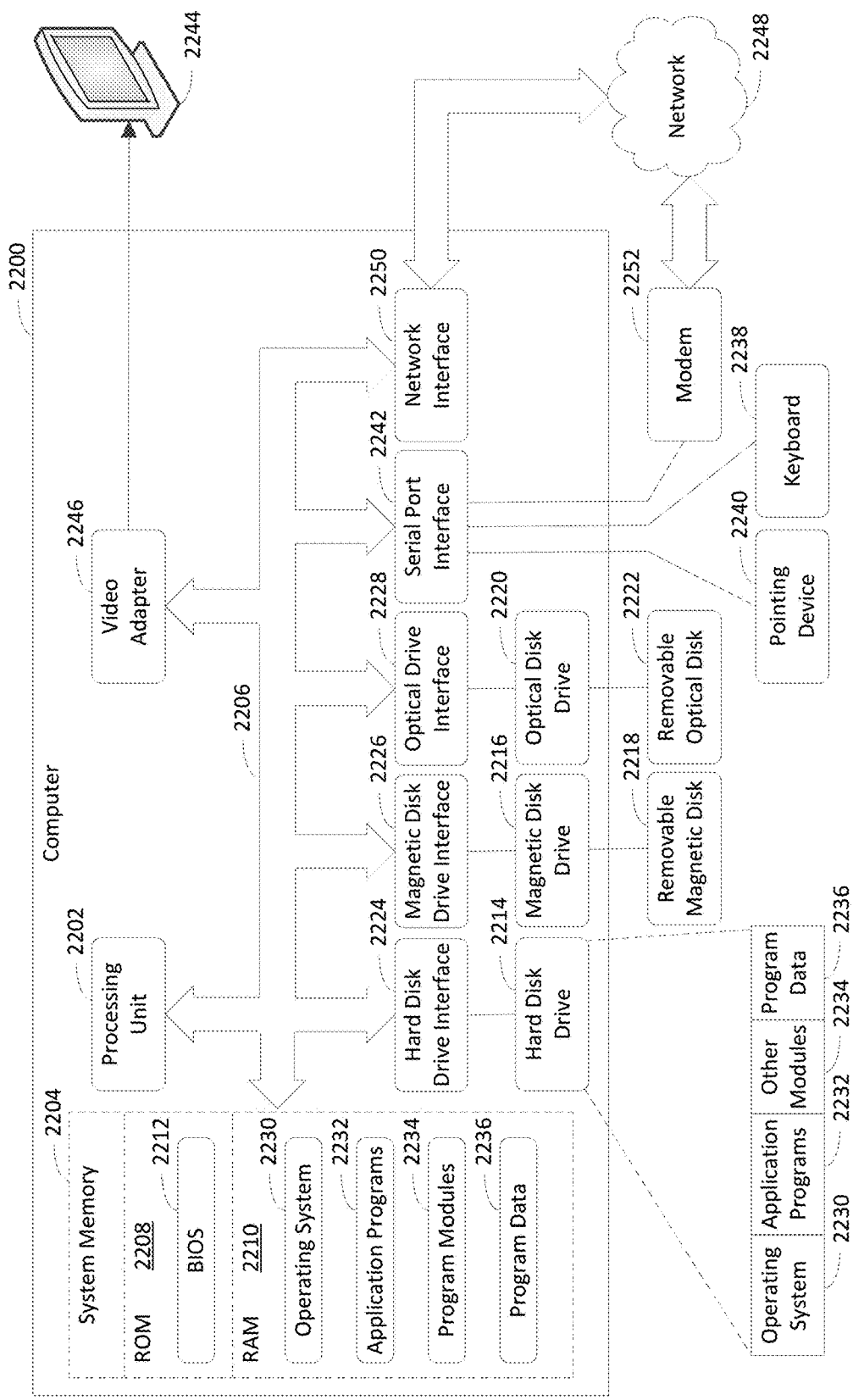
FIG. 22 depicts an example computer in which embodiments may be implemented.

FIG. 22 depicts an example computer 2200 in which embodiments may be implemented. Any one or more of client devices 102A-102M, any one or more of machines 106A-106N, and/or pivot-based gallery logic 108 shown in FIG. 1; and/or pivot-based gallery logic 2108, wrapping logic 2110, configuration logic 2112, generation logic 2114, display logic 2116, and/or implementation logic 2118 shown in FIG. 21 may be implemented using computer 2200, including one or more features of computer 2200 and/or alternative features. Computer 2200 may be a general-purpose computing device in the form of a conventional personal computer, a mobile computer, or a workstation, for example, or computer 2200 may be a special purpose computing device. The description of computer 2200 provided herein is provided for purposes of illustration, and is not intended to be limiting. Embodiments may be implemented in further types of computer systems, as would be known to persons skilled in the relevant art(s).

As shown in FIG. 22, computer 2200 includes a processing unit 2202, a system memory 2204, and a bus 2206 that couples various system components including system memory 2204 to processing unit 2202. Bus 2206 represents one or more of any of several types of bus structures, including a memory bus or memory controller, a peripheral bus, an accelerated graphics port, and a processor or local bus using any of a variety of bus architectures. System memory 2204 includes read only memory (ROM) 2208 and random access memory (RAM) 2210. A basic input/output system 2212 (BIOS) is stored in ROM 2208.

Computer 2200 also has one or more of the following drives: a hard disk drive 2214 for reading from and writing to a hard disk, a magnetic disk drive 2216 for reading from or writing to a removable magnetic disk 2218, and an optical disk drive 2220 for reading from or writing to a removable optical disk 2222 such as a CD ROM, DVD ROM, or other optical media. Hard disk drive 2214, magnetic disk drive 2216, and optical disk drive 2220 are connected to bus 2206 by a hard disk drive interface 2224, a magnetic disk drive interface 2226, and an optical drive interface 2228, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 2230, one or more application programs 2232, other program modules 2234, and program data 2236. Application programs 2232 or program modules 2234 may include, for example, computer program logic for implementing any one or more of pivot-based gallery logic 108, pivot-based gallery logic 2108, wrapping logic 2110, configuration logic 2112, generation logic 2114, display logic 2116, implementation logic 2118, flowchart 1900 (including any step of flowchart 1900), and/or flowchart 2000 (including any step of flowchart 2000), as described herein.

A user may enter commands and information into the computer 2200 through input devices such as keyboard 2238 and pointing device 2240. Other input devices (not shown) may include a microphone, joystick, game pad, satellite dish, scanner, touch screen, camera, accelerometer, gyroscope, or the like. These and other input devices are often connected to the processing unit 2202 through a serial port interface 2242 that is coupled to bus 2206, but may be connected by other interfaces, such as a parallel port, game port, or a universal serial bus (USB).

A display device 2244 (e.g., a monitor) is also connected to bus 2206 via an interface, such as a video adapter 2246. In addition to display device 2244, computer 2200 may include other peripheral output devices (not shown) such as speakers and printers.

Computer 2200 is connected to a network 2248 (e.g., the Internet) through a network interface or adapter 2250, a modem 2252, or other means for establishing communications over the network. Modem 2252, which may be internal or external, is connected to bus 2206 via serial port interface 2242.

As used herein, the terms "computer program medium" and "computer-readable storage medium" are used to generally refer to media (e.g., non-transitory media) such as the hard disk associated with hard disk drive 2214, removable magnetic disk 2218, removable optical disk 2222, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 2232 and other program modules 2234) may be stored on the hard disk, magnetic disk, optical disk, ROM, or RAM. Such computer programs may also be received via network interface 2250 or serial port interface 2242. Such computer programs, when executed or loaded by an application, enable computer 2200 to implement features of embodiments discussed herein. Accordingly, such computer programs represent controllers of the computer 2200.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to provide a pivot-based tile gallery with an adapted tile, the system comprising:
   memory; and
   one or more processors coupled to the memory, the one or more processors configured to:
   configure a tile, wherein the tile is wrapped in a wrapper of an adapted tile and is configured to implement functionality of an aspect of a resource based on one or more first inputs, the tile having a first code interface that is configured to receive the one or more first inputs, the one or more first inputs including a bindable first input;
   configure the wrapper to utilize the tile to implement the functionality of the aspect of the resource based on one or more second inputs, at least one of the one or more second inputs being different from at least one of the one or more first inputs, the wrapper having a second code interface that is configured to receive the one or more second inputs, the one or more second inputs including a bindable second input;
   configure the wrapper to bind the bindable second input that the second code interface of the wrapper is configured to receive to the bindable first input that the first code interface of the tile is configured to receive;
   generate a tile gallery that includes tiles that are configured to provide user interface (UI) representations of aspects of resources that are accessible via an application; and
   cause display of a UI representation of the tile gallery that comprises:
      a first pivot element that enables selection of a subset from subsets of the tiles, each subset including at least one of the tiles, and
      first UI representations of the aspects that are provided by the tiles in a selected subset, which is selected via the first pivot element, and not second UI representations of the aspects that are provided by the tiles that are not included in the selected subset, the first UI representations being selectable to cause functionality of the aspects that are associated with the respective tiles to be implemented, the first UI representations including a selectable UI representation that corresponds to the adapted tile and that is selectable to cause the functionality of the aspect to be implemented.

2. The system of claim 1, wherein the one or more processors are configured to cause the display of the UI representation of the tile gallery that further comprises:
   a second pivot element that enables selection of a selected resource group from multiple resource groups, each resource group including a respective subset of the resources; and
   wherein the first pivot element enables selection of a selected resource from the subset of the resources in the selected resource group, the selected resource corresponding to the selected sub set.

3. The system of claim 1, wherein the one or more second inputs include a single input, the single input being the bindable second input; and
   wherein the one or more first inputs include multiple inputs.

4. The system of claim 1, wherein the one or more processors are configured to configure the wrapper to provide the bindable second input unmodified to the tile to serve as the bindable first input.

5. The system of claim 1, wherein the one or more processors are configured to configure the wrapper to translate the bindable second input from a first form to a second form and to provide the second form to the tile to serve as the bindable first input.

6. The system of claim 1, wherein the one or more processors are configured to configure the wrapper to infer at least one of the one or more first inputs from at least one of the one or more second inputs.

7. The system of claim 1, wherein the one or more processors are configured to configure the wrapper to set at least one of the one or more first inputs to at least one respective default value.

8. The system of claim 1, wherein the one or more second inputs include an identifier that specifies the application;
   wherein the one or more processors are configured to configure the wrapper to generate a query that specifies the one or more first inputs based on the identifier; and
   wherein the tile is configured to execute the query to enable the adapted tile to provide the functionality of the aspect of the resource.

9. The system of claim 1, wherein a plurality of adapted tiles include a plurality of respective wrappers that wrap the tile; and
   wherein the one or more processors are configured to configure each wrapper of the plurality of wrappers to utilize the tile to implement the functionality of the aspect of the resource based on one or more respective second inputs, at least one of the one or more respective second inputs being different from at least one of the one or more first inputs, each wrapper of the plurality of wrappers having a respective second code interface that is configured to receive the one or more respective second inputs.

10. The system of claim 1, wherein the tile is configured to indicate a first manner in which the functionality of the aspect of the resource is to be implemented based on selection of a UI representation that corresponds to the tile;
    wherein the adapted tile is configured to indicate a second manner in which the functionality is to be implemented based on selection of the selectable UI representation; and
    wherein the second manner is different from the first manner.

11. A method of providing a pivot-based tile gallery with an adapted tile using one or more processors of a processor-based system, the method comprising:
    configuring, using at least one of the one or more processors, a tile, wherein the tile is wrapped in a wrapper of an adapted tile and is configured to implement functionality of an aspect of a resource that is accessible via an application based on one or more first inputs, the tile having a first code interface that is configured to receive the one or more first inputs, the one or more first inputs including a bindable first input;
    configuring, using at least one of the one or more processors, the wrapper to utilize the tile to implement the functionality of the aspect of the resource based on one or more second inputs, at least one of the one or more second inputs being different from at least one of the one or more first inputs, the wrapper having a second code interface that is configured to receive the one or more second inputs, the one or more second inputs including a bindable second input;

configuring, using at least one of the one or more processors, the wrapper to bind the bindable second input that the second code interface of the wrapper is configured to receive to the bindable first input that the first code interface of the tile is configured to receive;

generating, using at least one of the one or more processors, a tile gallery that includes tiles that are configured to provide user interface (UI) representations of aspects of resources that are accessible via the application; and causing, using at least one of the one or more processors, display of a UI representation of the tile gallery, comprising:

causing display of a first pivot element that enables selection of a subset from subsets of the tiles, each subset including at least one of the tiles; and causing display of first UI representations of the aspects that are provided by the tiles in a selected subset, which is selected via the first pivot element, and not second UI representations of the aspects that are provided by the tiles that are not included in the selected subset, the first UI representations being selectable to cause functionality of the aspects that are associated with the respective tiles to be implemented, the first UI representations including a selectable UI representation that corresponds to the adapted tile and that is selectable to cause the functionality of the aspect to be implemented.

12. The method of claim 11, wherein causing display of the first UI representations comprises:

causing display of the first UI representations of the aspects that are provided by the tiles in the selected subset and not the UI representations of the aspects that are provided by the tiles in others of the subsets.

13. The method of claim 11, wherein causing display of the UI representation of the tile gallery further comprises:

causing display of a second pivot element that enables selection of a group from multiple groups of the tiles, each group including respective subsets of the tiles; and wherein causing display of the first pivot element comprises:

causing display of the first pivot element that enables selection of a subset from the subsets in a selected group, which is selected via the second pivot element.

14. The method of claim 11, wherein causing display of the first pivot element comprises:

causing display of the first pivot element that enables selection of a selected resource from the resources, the selected resource corresponding to the selected subset.

15. The method of claim 11, wherein the one or more second inputs include a single input, the single input being the bindable second input; and wherein the one or more first inputs include multiple inputs.

16. The method of claim 11, wherein configuring the wrapper comprises:

configuring the wrapper to provide the bindable second input unmodified to the tile to serve as the bindable first input.

17. The method of claim 11, wherein configuring the wrapper comprises:

configuring the wrapper to translate the bindable second input from a first form to a second form and to provide the second form to the tile to serve as the bindable first input.

18. The method of claim 11, wherein configuring the wrapper comprises:

configuring the wrapper to set at least one of the one or more first inputs to at least one respective default value.

19. The method of claim 11, wherein the tile is configured to indicate a first manner in which the functionality of the aspect of the resource is to be implemented based on selection of a UI representation that corresponds to the tile;

wherein the adapted tile is configured to indicate a second manner in which the functionality is to be implemented based on selection of the selectable UI representation; and wherein the second manner is different from the first manner.

20. A computer program product comprising a computer-readable medium having computer program logic recorded thereon for enabling a processor-based system to perform operations to provide a pivot-based tile gallery with an adapted tile, the operations comprising:

configure a tile, wherein the tile is wrapped in a wrapper of an adapted tile and is configured to implement functionality of an aspect of a resource based on one or more first inputs, the tile having a first code interface that is configured to receive the one or more first inputs, the one or more first inputs including a bindable first input;

configure the wrapper to utilize the tile to implement the functionality of the aspect of the resource based on one or more second inputs, at least one of the one or more second inputs being different from at least one of the one or more first inputs, the wrapper having a second code interface that is configured to receive the one or more second inputs, the one or more second inputs including a bindable second input;

configure the wrapper to bind the bindable second input that the second code interface of the wrapper is configured to receive to the bindable first input that the first code interface of the tile is configured to receive;

generate a tile gallery that includes tiles that are configured to provide user interface (UI) representations of aspects of resources that are accessible via an application; and cause display of a UI representation of the tile gallery that comprises:

a first pivot element that enables selection of a subset from subsets of the tiles, each subset including at least one of the tiles, and first UI representations of the aspects that are provided by the tiles in a selected subset, which is selected via the first pivot element, and not second UI representations of the aspects that are provided by the tiles that are not included in the selected subset, the first UI representations being selectable to cause functionality of the aspects that are associated with the respective tiles to be implemented, the first UI representations including a selectable UI representation that corresponds to the adapted tile and that is selectable to cause the functionality of the aspect to be implemented.

* * * * *